(12) United States Patent
Eim et al.

(10) Patent No.: US 9,953,617 B2
(45) Date of Patent: Apr. 24, 2018

(54) FLEXIBLE DISPLAY DEVICE AND OPERATING METHOD THEREOF

(71) Applicant: LG ELECTRONICS INC., Seoul (KR)

(72) Inventors: Sanghyun Eim, Seoul (KR); Jumin Chi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/958,474

(22) Filed: Dec. 3, 2015

(65) Prior Publication Data

US 2017/0011714 A1 Jan. 12, 2017

(30) Foreign Application Priority Data

Jul. 6, 2015 (KR) .................. 10-2015-0095719

(51) Int. Cl.
| | | |
|---|---|---|
| *G09G 5/373* | (2006.01) | |
| *G09G 5/38* | (2006.01) | |
| *G06F 1/16* | (2006.01) | |
| *G06F 3/0483* | (2013.01) | |
| *G09G 3/20* | (2006.01) | |
| *H04M 1/02* | (2006.01) | |
| *G06F 3/0362* | (2013.01) | |
| *G06F 3/0484* | (2013.01) | |

(52) U.S. Cl.
CPC .......... *G09G 5/373* (2013.01); *G06F 1/1652* (2013.01); *G06F 1/1677* (2013.01); *G06F 3/0362* (2013.01); *G06F 3/0483* (2013.01); *G06F 3/04847* (2013.01); *G09G 3/20* (2013.01); *G09G 5/38* (2013.01); *H04M 1/0268* (2013.01); *G09G 2320/028* (2013.01); *G09G 2340/045* (2013.01); *G09G 2354/00* (2013.01); *G09G 2380/02* (2013.01); *H04M 1/0241* (2013.01)

(58) Field of Classification Search
CPC .......... G06F 3/016; G06F 3/011; G06F 3/038; G06F 3/03333; G06F 3/03313; G06F 3/04865; G06F 3/0487; G06F 3/044; G06F 3/04875; G06F 3/045
See application file for complete search history.

(56) References Cited

U.S. PATENT DOCUMENTS

| | | | | |
|---|---|---|---|---|
| 2004/0216056 | A1* | 10/2004 | Tootill | ................ G06F 3/04855 715/786 |
| 2006/0107532 | A1* | 5/2006 | Sun | ........................ B26B 5/001 30/162 |
| 2007/0205997 | A1* | 9/2007 | Lieshout | ........... G02F 1/133305 345/204 |
| 2008/0222559 | A1* | 9/2008 | Kim | ....................... G06F 3/0488 715/785 |
| 2013/0127918 | A1* | 5/2013 | Kang | .................... G06F 3/0481 345/660 |

(Continued)

*Primary Examiner* — Todd Buttram
(74) *Attorney, Agent, or Firm* — Dentons US LLP

(57) ABSTRACT

A flexible display device that includes a display unit to display content information on a screen, wherein the screen can be expandable or reducible; a sensing unit to detect a size of the screen; and a control unit to display at least one of a first indicator for indicating a degree to which the screen of the display unit is expandable and a second indicator for indicating an amount of remaining content information.

15 Claims, 44 Drawing Sheets

(56) References Cited

U.S. PATENT DOCUMENTS

| | | | |
|---|---|---|---|
| 2013/0201208 A1* | 8/2013 | Cho | G06F 3/1431 345/619 |
| 2014/0204037 A1* | 7/2014 | Kim | G06F 1/1647 345/173 |
| 2015/0185968 A1* | 7/2015 | Kim | G06F 3/0487 715/788 |

* cited by examiner

FLEXIBLE DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2015-0095719 (filed on Jul. 6, 2015), which is hereby incorporated by reference in its entirety.

BACKGROUND

The present disclosure relates to a flexible display device and an operating method thereof.

With the recent development of display related technology, flexible display devices at the usage stage, for example, rolled in a roll form or flexible in at least one direction, are being studied and developed. Since these displays are flexible in various forms, they satisfy the demand on a large-sized display at the usage state and a small-sized display for carrying.

Moreover, flexible display devices may be deformed to a predetermined form and also may be deformed to various forms in correspondence to a user's request or the need of a situation where a display is used. Accordingly, when the display area of a display is fixed, there may be inconvenience in use.

SUMMARY

Embodiments provide a flexible display device that is expanded or reduced only with a simple operation according to a user's request.

Embodiments also provide a flexible display device for providing a variety of information according to the degree to which the screen size of a display unit is expanded.

In one embodiment, provided is a flexible display device. The flexible display device comprises a display unit configured to display content information on a screen, wherein the screen can be expandable or reducible; a sensing unit configured to detect a size of the screen; and a control unit configured to display at least one of a first indicator for indicating a degree to which the screen of the display unit is expandable and a second indicator for indicating an amount of remaining content information.

wherein the first indicator comprises an expansion guide bar for indicating a degree to which the screen of the display unit is expanded to the maximum; and a movement bar disposed on the expansion guide bar and indicating to which degree the screen of the display unit is expanded currently.

wherein the second indicator comprises an entire information amount bar for indicating an entire content information amount; and a movement information bar for indicating to which degree content information among the entire content information amount is displayed on the screen of the display unit.

wherein if the content information includes a plurality of pages, a page number currently displayed on the screen of the display unit with respect to an entire page number is displayed on the second indicator.

wherein the entire information amount bar is divided into a plurality of sub areas respectively representing the plurality of pages.

wherein the control unit displays the first indicator of an expansion or a reduction of the screen of the display unit in a specific direction is detected.

wherein the control unit displays the second indicator if an expansion or a reduction of the screen of the display unit in a specific direction is not detected.

wherein if the screen of the display unit is expanded to the maximum and the content information to be displayed further remains, as additional expansion of the screen of the display unit in the specific direction is detected, the control unit sequentially displays remaining content information without sequentially displaying existing displayed content information.

wherein if the screen of the display unit is expanded to the maximum and the content information to be displayed further remains, the control unit displays an icon for reducing entire content information on the screen.

wherein if the screen of the display unit is not expanded to the maximum and remaining content information is all displayed, as detecting additionally an expansion of the screen of the display unit in the specific direction, the control unit displays related information relating to the content information in an expanded area.

wherein the related information comprises at least one of an enlargement icon for enlarging and displaying the content information and information on an application relating to the content information.

wherein the control unit enlarges the content information on an expanded screen according to receiving a request for selecting the enlargement icon.

wherein the flexible display device is a rollable display device.

wherein if the screen of the display unit is unwound out of an opened region of an intermediate case, the control unit displays at least one of the first indicator and the second indicator based on the size of the unwound screen of the display unit.

wherein the control unit changes a display of the first indicator or a display of the second indicator in accordance with the size of the unwound screen of the display unit is changed.

The details of one or more embodiments are set forth in the accompanying drawings and the description below. Other features will be apparent from the description and drawings, and from the claims.

DETAILED DESCRIPTION OF THE EMBODIMENTS

Figure 1A:
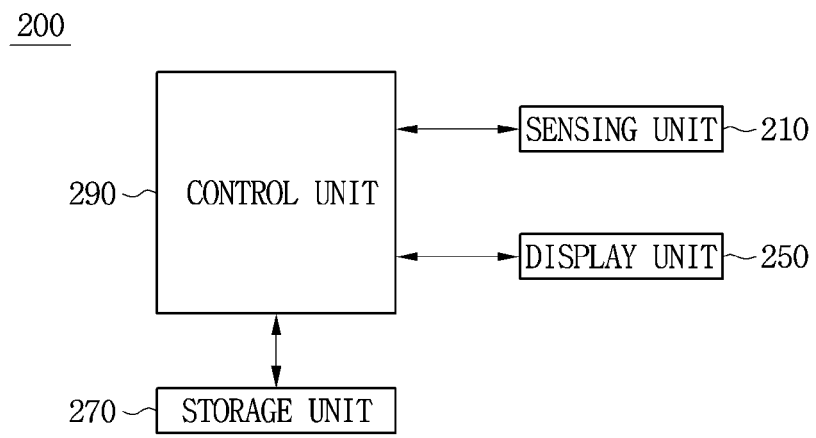
FIG. 1A is a view illustrating a configuration of a flexible display device according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and, do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Figure 1B:
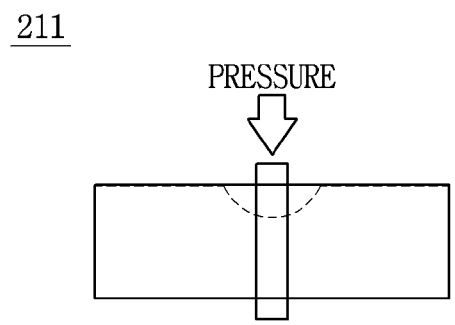
FIG. 1B is a view illustrating a pressure sensor configuring a sensing unit.
Figure 1C:
FIG. 1C is a view illustrating a configuration of a display unit where a sensing unit includes a plurality of acceleration sensors.

FIGS. 1A to 1C are views illustrating a configuration of a flexible display device according to an embodiment of the present invention.

Especially, FIG. 1A is a block diagram illustrating a configuration of a flexible display device 200 according to an embodiment of the present invention. FIG. 1B is a view illustrating a pressure sensor 211 configuring a sensing unit 210. FIG. 1C is a view illustrating a configuration of a display unit 250 where a plurality of acceleration sensors 231-1 to 213-4.

Unlike an existing display that is implemented only with rigid material such as glass or silicon, the flexible display device 200 according to an embodiment of the present invention is a next generation display device that is implemented in various and new environments due to its bending and flexible characteristics.

According to an embodiment of the present invention, the flexible display device 200 may be a stretchable display device that is stretched when pulled and reduced to its original state again when released. The stretchable display device is stretched when pulled and fixed in a stretched state when a predetermined time elapses in the stretched state. Additionally, the stretchable display device may be reduced to its original state when reducing force is applied.

According to another embodiment of the present invention, the flexible display device 200 may be a rollable display device that is rolled in a roll form or changeable to be unrolled like paper.

Referring to FIG. 1A, the flexible display device 200 may include a sensing unit 210, a display unit 250, a storage unit 270, and a control unit 290.

The sensing unit 210 detects that the display unit 250 is expanded or reduced. The sensing unit 210 detects that a screen of the display unit 250 is expanded or reduced.

The sensing unit 210 may detect the intensity of force and the direction of force, which are applied to the display unit 250.

According to an embodiment of the present invention, the sensing unit 210 may include at least one pressure sensor. At least one pressure sensor may be disposed at the display unit 250. When the sensing unit 210 includes at least one pressure sensor, each pressure sensor 211, as shown in FIG. 1B, may detect changes in capacitance or resistance between both ends of an area where pressure (force) is applied. The pressure sensor 211 may deliver at least one of a capacitance change signal indicating the detected change in capacitance or a resistance change signal indicating the detected change in resistance to the control unit 290. The capacitance change signal or the resistance change signal may include information on at least one of the intensity and direction of a force applied to the pressure sensor 211. The control unit 290 may obtain at least one of the direction and intensity of a force applied to the display unit 250 by using a capacitance change signal or a resistance change signal, which is received from the pressure sensor 211.

According to another embodiment of the present invention, the sensing unit 210, as shown in FIG. 1C, may include a plurality of acceleration sensors 213-1 to 213-4. When the display unit 250 has a rectangular form, each acceleration sensor may be disposed adjacent to each vertex of a rectangle. When the display unit 250 includes a flexible substrate and an image display unit described later, the plurality of acceleration sensors 213-1 to 213-4 may be disposed at a lower end of the flexible substrate and the image display unit may be disposed at an upper end of the flexible substrate but this is just exemplary and they may be built in the flexible substrate or the image display unit.

The acceleration sensor is a sensor for detecting an acceleration when object moves or the intensity of impact. When the acceleration sensor is used, a movement state of the display unit 250 is detected in more detail. The acceleration sensor may sense an acceleration of the display unit 250 in a direction of each of three axes (for example, an x-axis, a y-axis, and a z-axis) vertical to each other. The control unit 290 may obtain a movement speed by using the accelerations of the 3-axes directions measured through the acceleration sensor. The control unit 290 may obtain a distance that the display unit 250 extends in the 3-axes directions by using the obtained movement speed. The control unit 290 may obtain the direction and intensity of force applied to the display unit 250 by using a movement speed and a movement distance obtained by using an acceleration sensor. The control unit 290 may expand the display unit 250 according to the obtained direction and intensity of force.

According to another embodiment of the present invention, the sensing unit 210 may include a plurality of hole sensors. The plurality of hole sensors may be disposed inside or on the display unit 250. When the sensing unit 210 includes a plurality of hole sensors, the control unit 290 may expand or reduce the display unit 250 through a voltage detected from a hole sensor according to a force applied to the display unit 250.

The display unit 250 may be stretched in at least one direction. The display unit 250 may include a flexible substrate and an image display unit. The flexible substrate may be configured with polydimethylsiloxane (PDMS) having excellent stretchability and may be expanded according to pulling force. An image display unit may be formed on the flexible substrate and may be expanded as the flexible substrate expands. The image display unit may display an image.

The display unit 250 may include an organic light emitting diode (OLED).

The storage unit 270 may match the intensity of a force applied to the display unit 250 and the expansion or reduction degree of the display unit 250 corresponding to the intensity of force and store them. The expansion degree of the display unit 250 may represent a length that the display unit 250 expands and the reduction degree of the display unit 250 may represent a length that the display unit 250 is reduced.

The control unit 290 may expand or reduce the display unit 250 according to a detection signal received through the sensing unit 210. The expansion of the display unit 250 may represent that the size of a screen displayed by the display unit 250 is enlarged and the reduction of the display unit 250 may represent that the size of a screen displayed by the display unit 250 is reduced. The control unit 290 may change a graphic or image displayed on a screen as the screen size of the display unit 250 is enlarged or reduced.

Besides that, the control module 290 may control overall operations of the flexible display device 200. More specific operations of the control unit 290 are described with reference to the drawings.

Figure 2A:
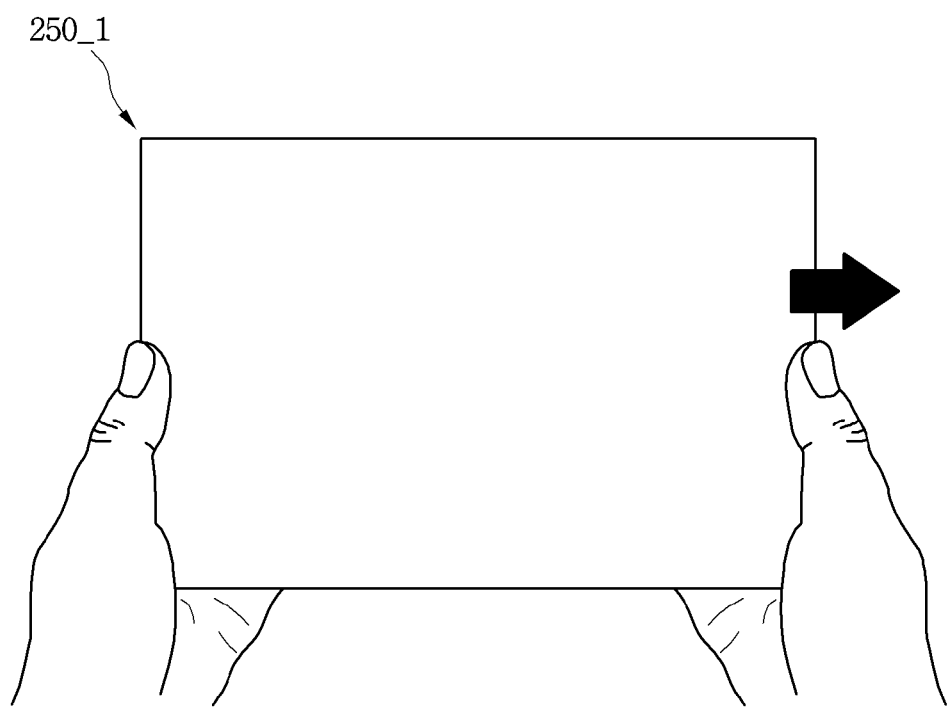
FIG. 2A and FIG. 2B are views illustrating a usage example of a stretchable display device that is an example of a flexible display device.
Figure 2B:
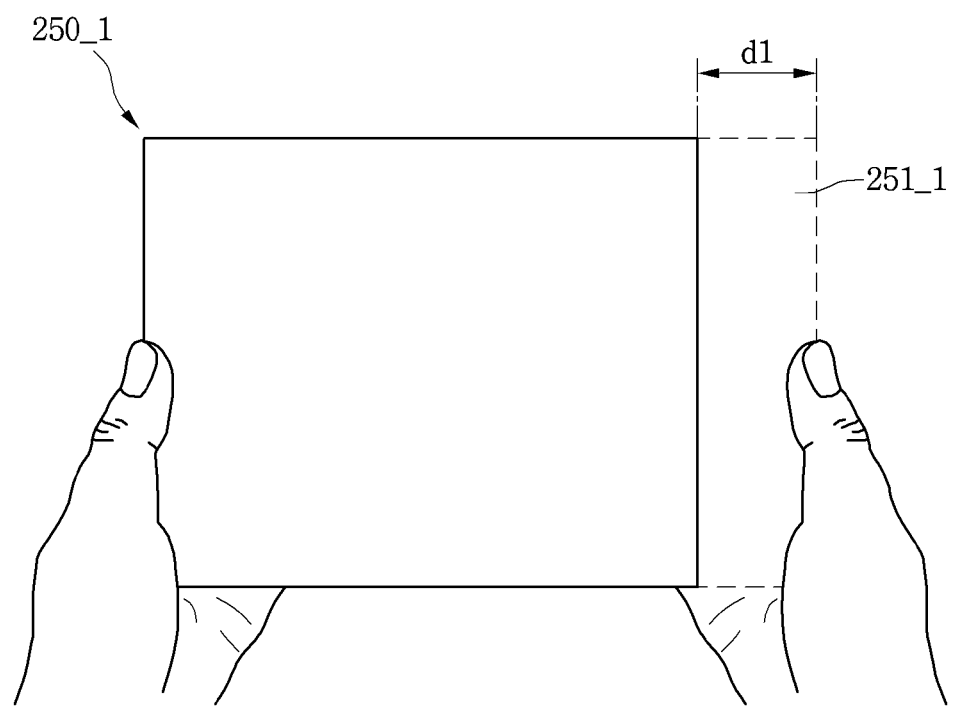

FIGS. 2A and 2B are views illustrating a usage example of a stretchable display device that is an example of a flexible display device.

FIG. 2A illustrates a display unit 250_1 of a state before a stretchable display unit 200_1 is stretched. In this state, when force is applied to the display unit 250_1 in a +x axis direction, the control unit 290, as shown in FIG. 2B, may expand the display unit 250_1 by an expansion distance d1 in the +x axis direction. As the display unit 250_1 expands, it may expand by an expansion area 251_1 corresponding to the expansion distance d1. That is, the screen size of the display unit 250 may be expanded by the expansion area 251_1. Although only a force applied in the +x axis direction is described with reference to FIG. 2, this is just exemplary. On the other hand, when force is applied to the display unit 250_1 in the −x axis direction, the control unit 290 may return the display unit 250_1 to its original size.

FIGS. 3A to 3F are diagrams illustrating a configuration and operation of a rollable display device which is a type of a flexible display device according to an embodiment.

Figure 3A:
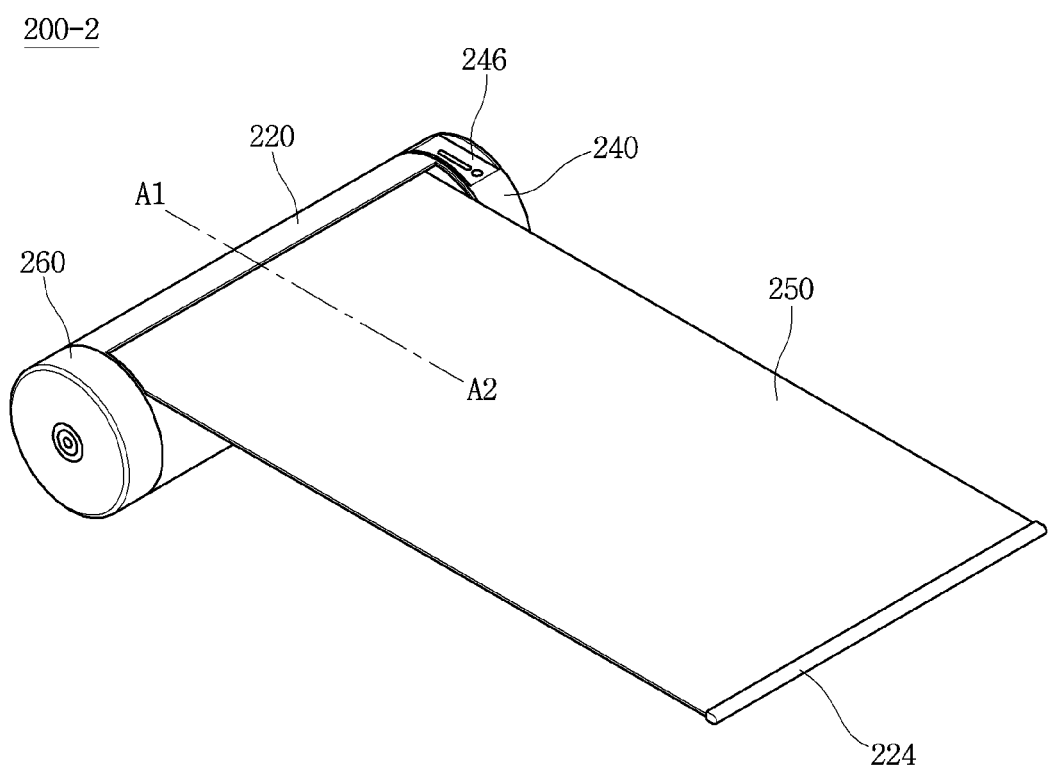
FIG. 3A, FIG. 3B, FIG. 3C, and FIG. 3D are diagrams illustrating a configuration and operation of a rollable display device which is a type of a flexible display device.
Figure 3B:
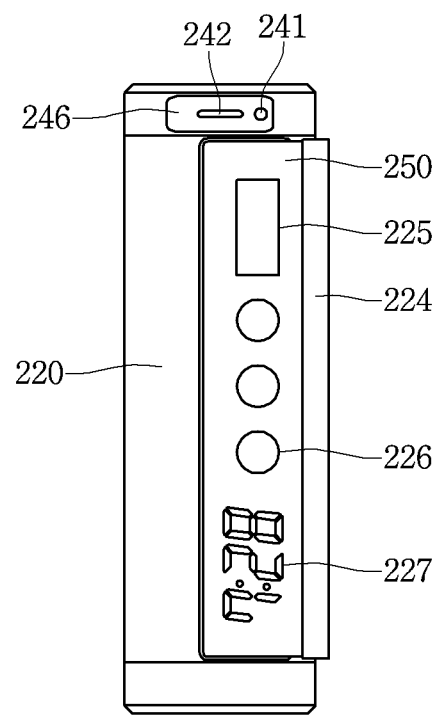
Figure 3C:
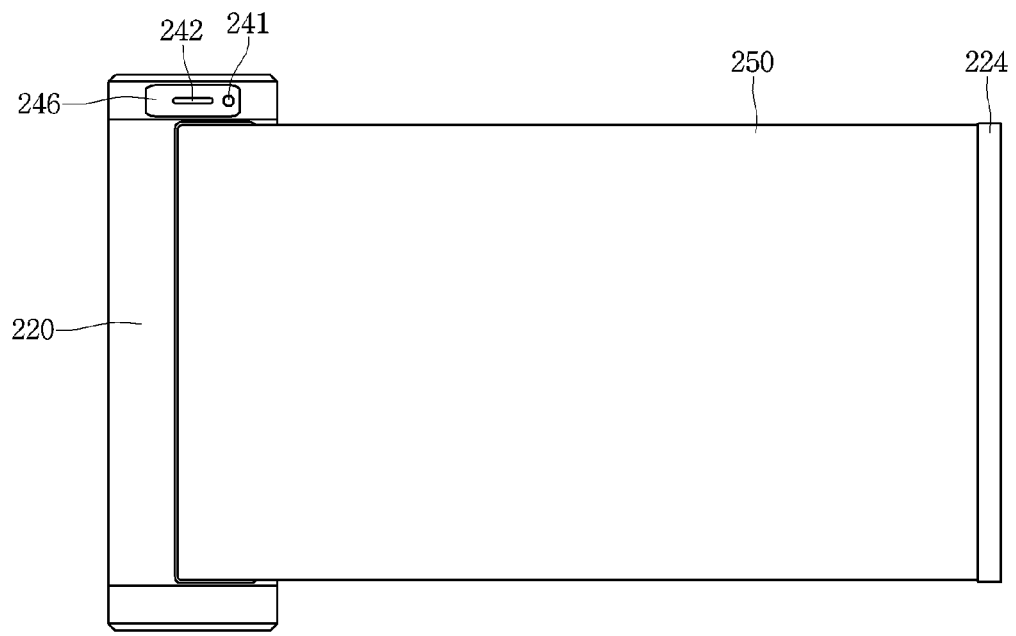
Figure 3D:
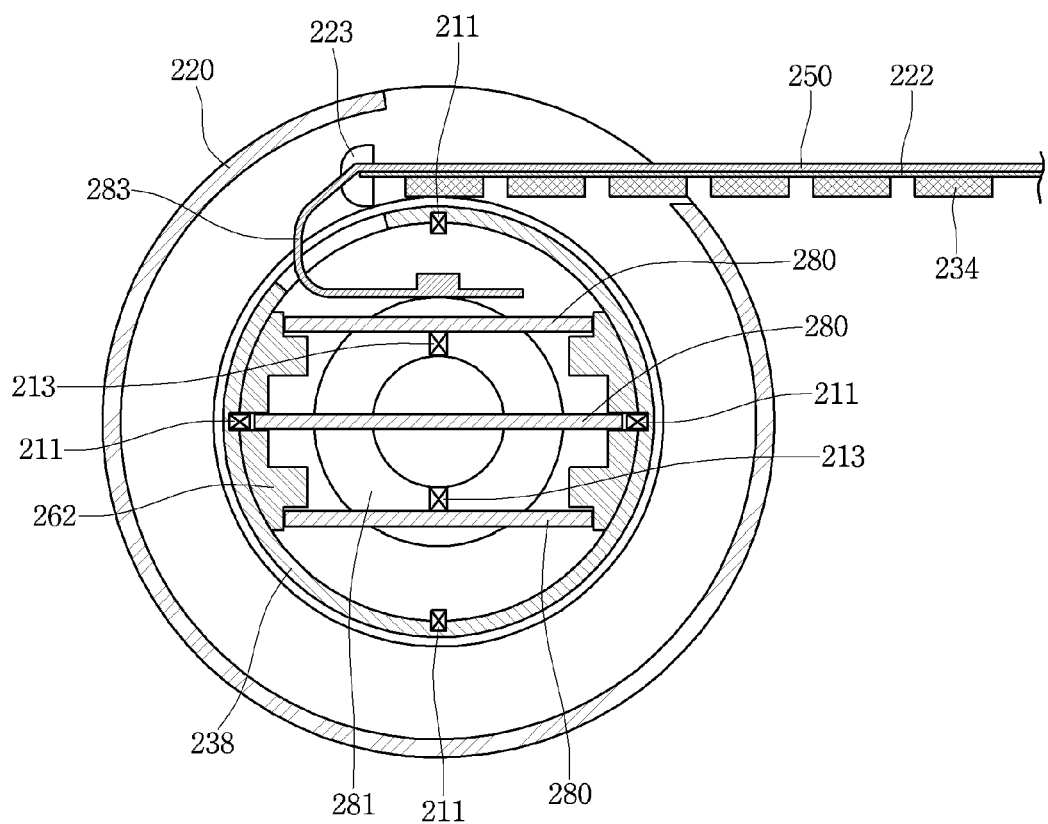
Figure 3E:
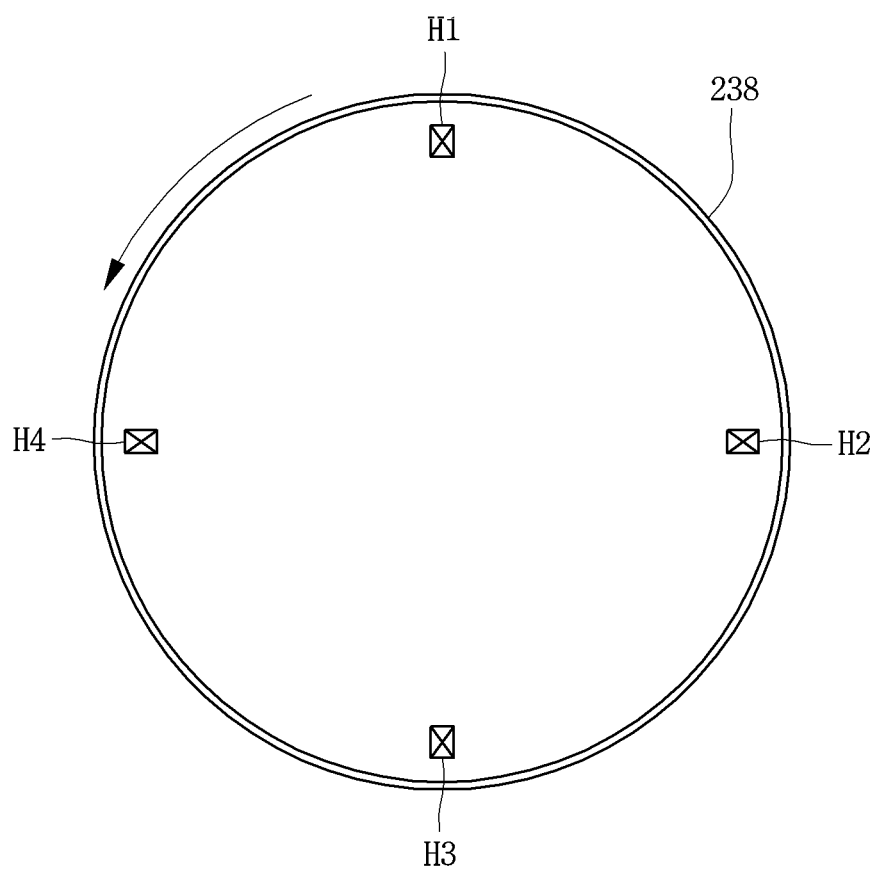
FIG. 3E and FIG. 3F are diagrams illustrating a process of sensing a spread length, a rolled length, or a rotation amount of a display unit using a hall sensor according to an embodiment of the disclosure.
Figure 3F:
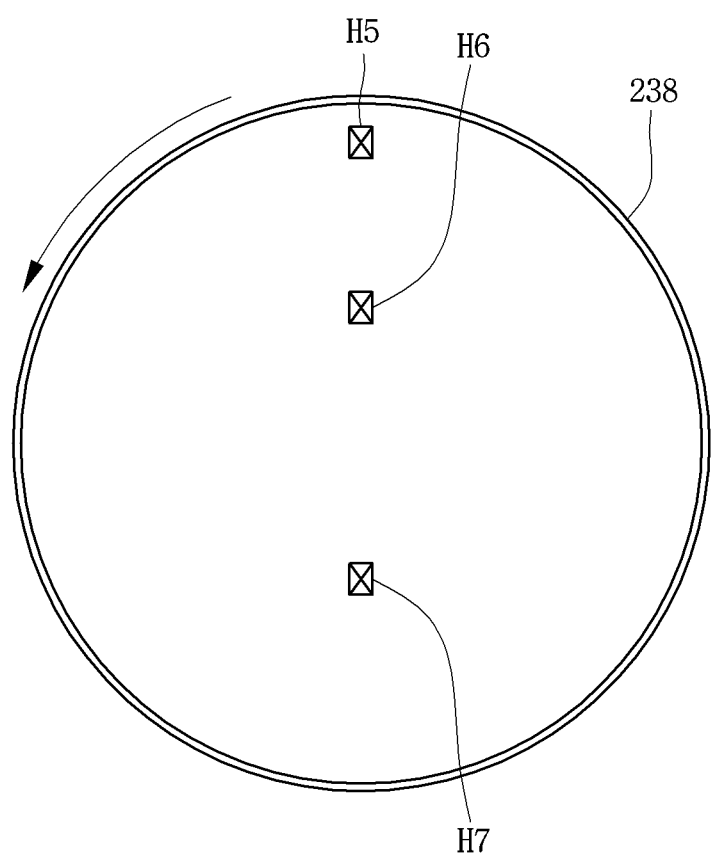

FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display unit using a hall sensor according to an embodiment.

Referring to FIGS. 3A to 3D, a rollable display device 200-2 may include an upper case 240, an intermediate case 220, a lower case 260, a display unit 250, a first holder 223, and a second holder 224.

The upper case 240, the lower case 260, and the intermediate case 220 form an exterior of the rollable display device 200-2. The intermediate case 220 may have a cylindrical shape, but is not limited thereto and may have various shapes such as a hexahedral shape. As illustrated in FIG. 3D, a part of the intermediate case 220 may be opened so as to expose a part of the display unit 250.

The upper case 240 and the lower case 260 may cover the intermediate case 220 at an upper side and a lower side thereof. The upper case 240 and the lower case 260 may not expose various components arranged inside the intermediate case 220. A recess part 246 may be formed in the upper case 240, wherein the recess part 246 may be recessed towards the inside of the upper case 240 so as to have a planar shape. At least one of a camera 241 or a sound output unit 242 may be disposed in the recess part 246. The first holder 223 (see FIG. 3D) may be provided to an end portion of one side of the display unit 250, and the second holder 224 may be provided to an end portion of another side of the display unit 250. The first holder 223 may prevent the display unit 250 from escaping from an inner side of the intermediate case 220 when a screen of the display unit 250 is maximally extended. The second holder 224 may prevent the display unit 250 from being rolled into the inner side of the intermediate case 220. A user may draw the second holder 224 in a specific direction to extend the screen of the display unit 250.

The display unit 250 may be rolled in towards the inner side of the intermediate case 220, or may be rolled out of the intermediate case 220. That is, the display unit 250 may be wound, rolled or coiled into the inner side of the intermediate case 220, or may be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

In a state in which the display unit 250 is not deformed (e.g., a state of having an infinite radius of curvature, hereinafter referred to as the first operation state), a region displayed by the display unit 250 may be a plane. In a state in which the display unit 250 is deformed by an external force in the first operation state (e.g., a state of having a finite radius of curvature, hereinafter referred to as the second operation state), a region displayed by the display unit 250 may be a curved surface. As illustrated in the drawings, information displayed in the second operation state may be time information output to the curved surface. Such time information may be implemented by individually controlling light emission of sub-pixels arranged in a matrix.

In the first operation state, the display unit 250 may not be flat but curved (e.g., vertically or horizontally curved). In this case, when an external force is applied to the display unit 250, the display unit 250 may be deformed to be flat (or less curved) or more curved.

The display unit 250 may be combined with a touch sensor to implement a flexible touch screen. When the flexible touch screen is touched, a control unit 290 may perform control corresponding to the touch input. The flexible touch screen may detect a touch input not only in the first operation state but also in the second operation state.

The rollable display device 200-2 according to an embodiment may be provided with a deformation detecting unit for detecting deformation of the display unit 250. The deformation detecting unit may be included in the sensing unit 210 (see FIG. 1A).

The deformation detecting unit may be provided to the display unit 250 or the intermediate case 220 so as to detect information on deformation of the display unit 250. Here, the information on deformation may include a deformation direction, a deformation degree, a deformation portion, or a deformation time of the display unit 250 or an acceleration of recovery of the display unit 250 deformed, or may additionally include various information detectable due to warpage of the display unit 250.

Furthermore, the control unit 290 may change information displayed on the display unit 250 or may generate a control signal for controlling a function of the rollable display device 200-2, on the basis of the information on deformation of the display unit 250 detected by the deformation detecting unit.

In an embodiment, the first operation state of the rollable display device 200-2 represents an inactive state in which a minimum display region is exposed to the outside so that basic information alone is displayed. The second operation state of the rollable display device 200-2 represents an active state in which the display unit 250 is extended. Extending of the display unit 250 may indicate that a screen displayed by the display unit 250 is extended. This extending includes gradational extending. A display region of the rollable display device 200-2, which is extended or reduced by rolling the display unit 250, may be implemented at one time at the moment of the extending or reducing, or the display region may be gradually extended or reduced. Therefore, hereinafter all states excepting the first operation state may be regarded as the second operation state, and the second operation state may be classified into a plurality of stages according to a degree of extension.

As illustrated in FIG. 3B, only regions such as a message window 225, an icon 226, or a time display part 227 may be displayed to minimize an exposed region of the display unit 250 in the first operation state. However, in the second operation state, the exposed region of the display unit 250 may be maximized to display information on a larger screen as illustrated in FIG. 3C. It is assumed that FIG. 3C illustrates a state in which the display unit 250 is maximally extended in some cases.

The control unit 290 (see FIG. 1A) may detect an unwound length of the display unit 250, and may turn on/off a part of the display unit 250 on the basis of the unwound length. For example, the control unit 290 may obtain a length of the display unit 250 unwound out of an opened region of the intermediate case 220. The control unit 290 may turn off the display unit 250 disposed inside the intermediate case 220, and may turn on the display unit 250 unwound out of the opened region of the intermediate case 220. Turning on a part of the display unit 250 may represent that power is applied so that the part of the display unit 250 displays information, and turning off a part of the display unit 250 may represent that power is not applied so that the part of the display unit 250 does not display information. Accordingly, since a part of the display unit 250 which is not unwound out of the intermediate case 220 is turned off, unnecessary power consumption and heating may be prevented.

Furthermore, when the display unit 250 is separated from an outer circumferential surface of an inner case 238, the control unit 290 may turn on a separated part of the display unit 250 and may turn off a non-separated part of the display unit 250. The control unit 290 may detect that the display unit 250 is separated from the outer circumferential surface of the inner case 238 using a length sensing unit 211 disposed in an inner circumferential surface of the inner case 238, so as to turn on the separated part of the display unit 250 and turn off the non-separated part of the display unit 250.

Referring to FIG. 3D, a shaft 281, the inner case 238, the length sensing unit 211, a rotation amount sensing unit 213, a plurality of circuit boards 280, a flexible circuit board 283, and a support frame 262 may be arranged in the intermediate case 220.

The shaft 281 may be rotated as the inner case 238 rotates.

The inner case 238 may be shaped like a roller, may be rollable, and may serve to wind or unwind the display unit

250. The inner case 238 is axially connected to the intermediate case 220 so as to be rotatable.

The length sensing unit 211 may sense a wound length or an unwound length of the display unit 250. The length sensing unit 211 may include a magnetic member. The length sensing unit 211 may include at least one hall sensor. The length sensing unit 211 will be described later in more detail.

The rotation amount sensing unit 213 may sense the number of turns of the display unit 250 wound on the inner case 238. That is, the rotation amount sensing unit 213 may sense the number of turns of the display unit 250 wound on the inner case 238 as the display unit 250 is rolled. The rotation amount sensing unit 213 may include a magnetic member. The rotation amount sensing unit 213 may include at least one hall sensor. The rotation amount sensing unit 213 will be described later in more detail.

A plurality of electronic circuit components for operating the rollable display device 200-2 may be mounted on each circuit board 280.

The flexible circuit board 283 may connect electronic circuit components mounted on the inner case 238 to the display unit 250. The electronic circuit component may include at least one of the sensing unit 210, the storage unit 270, or the control unit 290 illustrated in FIG. 1A.

The support frame 262 may support the circuit board 280, and may be disposed in the inner case 238.

The inner case 238 may be rotated by magnetism between the length sensing unit 211 and rolling sensing units 234 spaced apart from each other under the display unit 250. The rolling sensing unit 234 may include a magnetic member, and may include at least one hall sensor. The display unit 250 may be rotated together with the inner case 238 while being rolled on the inner case 238 by the magnetism. In detail, the display unit 250 may be rolled by attraction between the rolling sensing unit 234 and the length sensing unit 211. For example, in the case where the length sensing unit 211 includes an N-pole magnetic member and the rolling sensing unit 234 includes an S-pole magnetic member, they attract each other. A position of the length sensing unit 211 may be fixed. The rolling sensing unit 234 is attracted towards the length sensing unit 211 while moving linearly, and the rolling sensing units 234 spaced apart from each other are continually introduced into the intermediate case 220. Since the rolling sensing unit 234 that has been already introduced and the length sensing unit 211 continuously attract each other, the rolling sensing unit 234 newly introduced and the length sensing unit 211 maintain a balance in terms of attraction so that the rolling sensing units 234 are rotated around the length sensing units 211. By virtue of this mechanism, the display unit 250 is wound while being rolled.

A sheet 222 provided with the rolling sensing unit 234 may be disposed on a lower surface of the display unit 250. The sheet 222 may be included in the display unit 250, or may be present independently from the display unit 250. The sheet 222 may be flexible. For example, the sheet 222 may be silicone or Thermoplastic Poly Urethane (TPU). The sheet 222 may be bonded to the lower surface of the display unit 250 in the form of a sheet frame, may sequentially fix the rolling sensing units 234, and may be formed through bonding, tape or insert molding. Furthermore, the sheet 222 may be formed of a material that is flexible, has excellent elasticity and elongation, and enables maintenance of a small thickness of the sheet 222. This is intended to allow the rolling sensing units 234 to have the same magnetic pole so that the display unit 250 is spread flat by repulsion. That is, the rolling sensing units 234 having the same magnetic pole repel each other by a repulsive force so that the display unit 250 is spread flat.

The length sensing unit 211 may sense magnetism between the rolling sensing unit 234 and the length sensing unit 211 to calculate the wound length or the unwound length of the display unit 250. The rotation amount sensing unit 213 may sense the number of turns of the display unit 250 wound on the outer circumferential surface of the inner case 238. This will be described later in more detail with reference to FIGS. 3E and 3F.

Referring to FIG. 3E, the length sensing unit 211 may include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensing unit 234 by sensing a change of magnetism in the circumferential direction of the inner case 238.

The arrows of FIGS. 3E and 3F represent a rotation direction of the inner case 238. The first hall sensor H1 alone senses the rolling sensing unit 234 in the second operation state in which the display unit 250 is maximally exposed as the inner case 238 is rotated. Thereafter, when the inner case 238 is rotated counterclockwise, the display unit 250 is wound on the inner case 238, and the second to fourth hall sensors H2 to H4 sequentially sense the rolling sensing unit 234. As described above, the first to fourth hall sensors H1 to H4 provide information for measuring a length of the display unit 250 wound along the outer circumferential surface of the inner case 238. The control unit 290 may detect a sensor that lastly senses the rolling sensing unit 234 when the display unit 250 is wound or unwound. Accordingly, the control unit 290 may calculate the wound length or the unwound length of the display unit 250. This is the same for the case where the display unit 250 is wound on the inner case 238 by multiple turns.

In the case where the display unit 250 is wound on the outer circumferential surface 238 in two or more layers, magnetism is changed in a radial direction of the inner case 238. Therefore, if a hall sensor for sensing the change is provided, the wound length of the display unit 250 may be measured more accurately.

For example, as illustrated in FIG. 3F, if two or more hall sensors are spaced apart from each other by a fixed distance in a radial direction of the inner case 238, a magnetism change of the rolling sensing unit 234 stacked in two or more layers on the outer circumferential surface of the inner case 238 may be sensed, so that the wound length of the display unit 250 may be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensing unit 234.

In more detail, in the second operation state (i.e., the state illustrated in FIG. 3D), the control unit 290 may calculate the wound length of the display unit 250 using the first to fourth hall sensors H1 to H4 while the display unit 250 is wound in one layer on the inner case 238. In the case where the display unit 250 is wound in two layers on the inner case 238, the fifth to seventh hall sensors H5 to H7 sense a change of magnetism in a radial direction. The control unit 290 may obtain the number of turns of the display unit 250 wound, using the magnetism change sensed by the fifth to seventh hall sensors H5 to H7. A length of the display unit 250 wound thereafter may be calculated using the first to fourth hall sensors H1 to H4, and, when the display unit 250 is stacked in three layers in a radial direction in which the fifth to seventh hall sensors H5 to H7 are arranged, the magnetism change is sensed by the fifth to seventh hall sensors H5 to H7. As described above, the control unit 290 may calculate the length of the display unit 250 wound on the outer circumferential surface of the inner case 238 using the first to fourth hall sensors H1 to H4, and may calculate the number of turns of the display unit 250 wound on the outer circumferential surface of the inner case 283 using the fifth to seventh hall sensors H5 to H7.

According to another embodiment, the rollable display device 200-2 may be additionally provided with the upper case 240, the intermediate case 220, and the lower case 260 at another end portion of the display unit 250. The elements described above with reference to FIG. 3D may be included in the intermediate case 220. Therefore, a user may grip the rollable display device 200-2 with both hands to extend or reduce the display unit 250.

The flexible display device 200 may include all of a configuration of a mobile terminal 100 described with reference to FIG. 4.

Then, a configuration of a mobile terminal in the flexible display device 200 will be described with reference to FIG. 4.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smartwatchs, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only mobile terminals.

Figure 4:
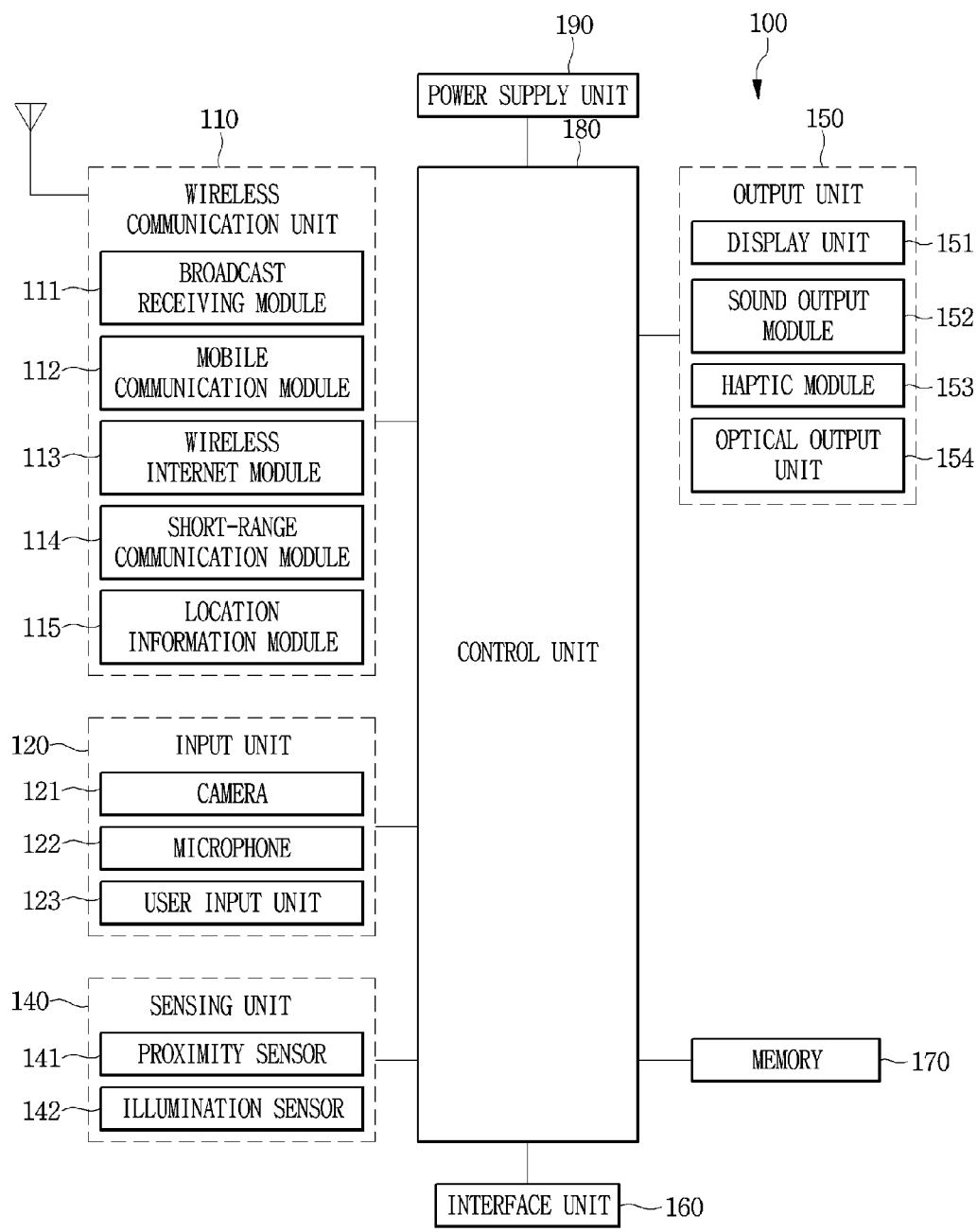
FIG. 4 is a block diagram illustrating a mobile terminal according to an embodiment of the present invention.

FIG. 4 is a block diagram illustrating a mobile terminal according to an embodiment of the present invention.

In this case, the flexible display device 200 may include the components of a mobile terminal 100. Especially, the sensing unit 210 of the flexible display device 200 may perform a function of a sensing unit 140 of the mobile unit 100, the display unit 250 may perform a function of the display unit 151 of the mobile terminal 100, and the storage 270 may perform a function of a memory 170 of the mobile terminal 100.

The mobile terminal 100 may include a wireless communication unit 110, an input unit 120, the sensing unit 140, an output unit 150, an interface unit 160, the memory 170, a control unit 180, and a power supply unit 190. In implementing a mobile terminal, components shown in FIG. 4 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the memory 170.

Additionally, in order to execute an application program stored in the memory 170, the control unit 180 may control at least part of the components shown in FIG. 4. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

Hereinafter, prior to examining various embodiments implemented through the mobile terminal 100, the above-listed components are described in more detail with reference to FIG. 4.

First, in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless internet module 113 refers to a module for wireless internet access and may be built in or external to the mobile terminal 100. The wireless internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (for example, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user may perform a phone call through the wearable device or when a message is received by the mobile terminal 100, a user may check the received message.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information inputted from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be inputted to the input terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit may control an operation of the mobile terminal 100 to correspond to the inputted information. The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be disposed on a touch screen and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch), long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical signal is much shorter than a time that ultrasonic wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image.

A three-dimensional display method, for example, a stereoscopic method (a glasses method), an autostereoscopic (no glasses method), a projection method (a holographic method) may be applied to the three-dimensional display unit The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments below may be implemented in a computer or device similar thereto readable medium by using software, hardware, or a combination thereof.

Then, a communication system using the mobile terminal 100 is described according to an embodiment of the present invention.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sensor and each sensor may include an omni-directional antenna or an antenna indicating a specific radial direction from a BS. Additionally, each sensor may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast reception module 111 shown in FIG. 36 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. If necessary, the position information module 115 may perform a function of another module in the wireless communication unit 110 in order to obtain data on the location of the mobile terminal substitutionally or additionally.

The GPS module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by using information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the motile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Then, various embodiments for an operating method of the flexible display device 200 are described. Embodiments of the present invention may be applied to the stretchable display device 200_1 described with reference to FIGS. 2A to 2B and the rollable display device 200_2 described with reference to FIGS. 3A to 3C.

Figure 5:
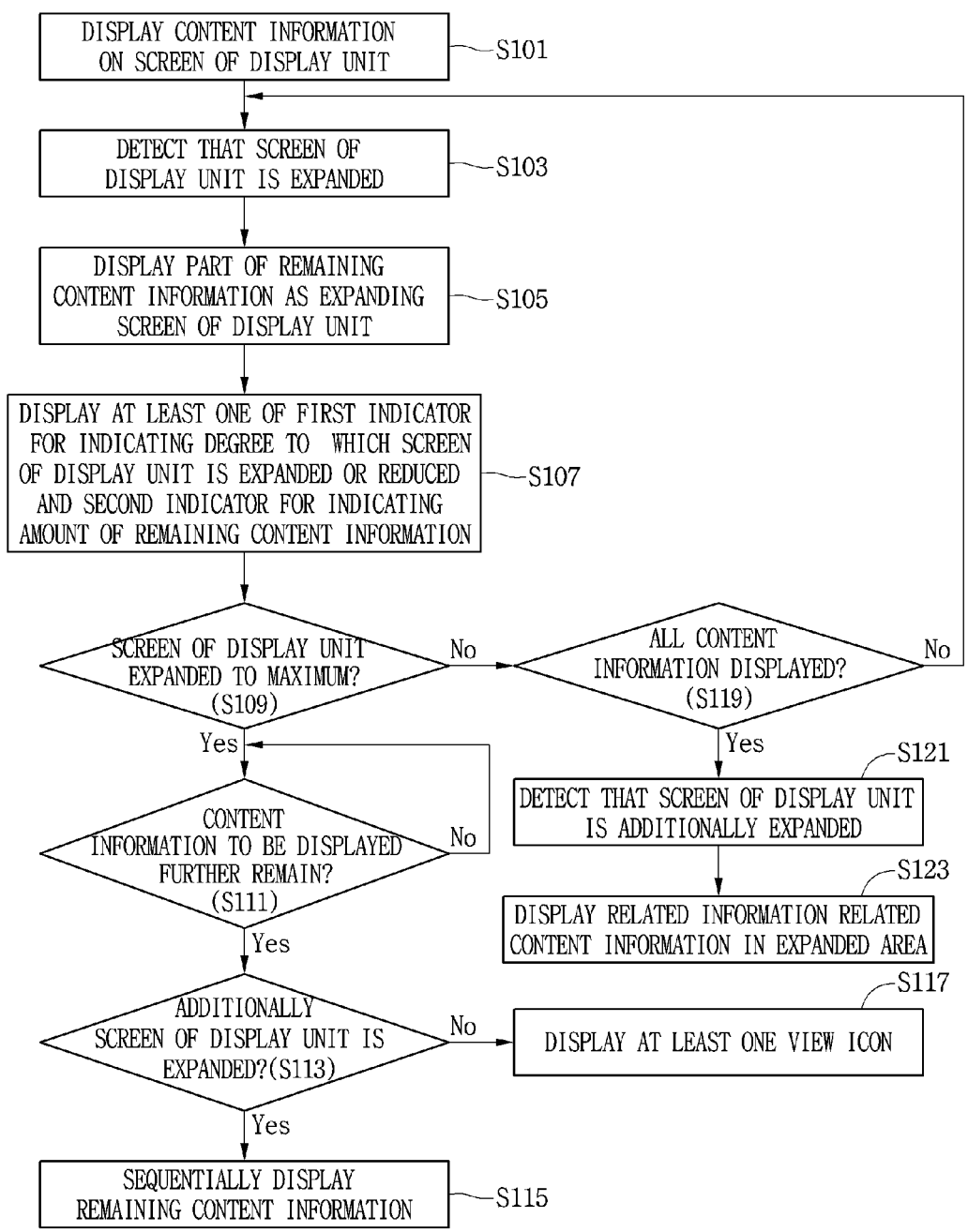
FIG. 5 is a flowchart illustrating an operating method of a flexible display device according to another embodiment of the present invention.

FIG. 5 is a flowchart illustrating an operating method of a flexible display device according to another embodiment of the present invention.

The control unit 290 of the flexible display device 200 displays content information on the screen of the display unit 250 in operation 5101. According to an embodiment of the present invention, the content information may be a webpage information according to the execution of a web application but the present invention is not limited thereto and the content information may include various forms of information such as information provided according to the execution of a specific application and information on a plurality of menu screens.

The control unit 290 detects that the screen of the display unit 250 is expanded in a specific direction through the sensing unit 210 in operation 5103.

The control unit 290 displays partial information of the remaining content information as expanding the screen of the display unit 250 in a specific direction according to a detected result in operation 5105. That is, as expanding the screen size of the display unit 250, the control unit 290 may control the display unit 250 to display partial information among content information that is not displayed in an area where the screen of the display unit 250 is expanded.

The control unit 290 displays on the screen of the display unit 250 at least one of a first indicator for indicating the degree to which the screen of the display unit 250 is expanded or reduced and a second indicator for indicating the amount of the remaining content information in operation S107.

According to an embodiment of the present disclosure, at least one of the first indicator and the second indicator may be displayed instantly when the control unit 290 detects that the screen size of the display unit 250 is expanded or reduced.

According to another embodiment of the present disclosure, at least one of the first indicator and the second indicator may be displayed even when the control unit 290 does not detect that the screen size of the display unit 250 is expanded or reduced In this case, operation S107 and operation 5101 may be performed at the same time.

The control unit 290 can display at least one of the first indicator and the second indicator according to the size of the screen of the display unit 250. The screen of the display unit 250 is wound on the inner case 238 (see FIG. 3D). If the screen of the display unit 250 is unwound out of an opened region of the intermediate case 220, the control unit 290 can display at least one of the first indicator and the second indicator based on the size of the unwound screen of the display unit 250. The control unit can change the first indicator and a display of the second indicator in accordance with the size of the unwound screen of the display unit is changed. Each of the first indicator and second indicator can reflect a change of the size of the unwound screen.

Operation S107 will be described below with reference to the accompanying drawings.

Figure 6A:
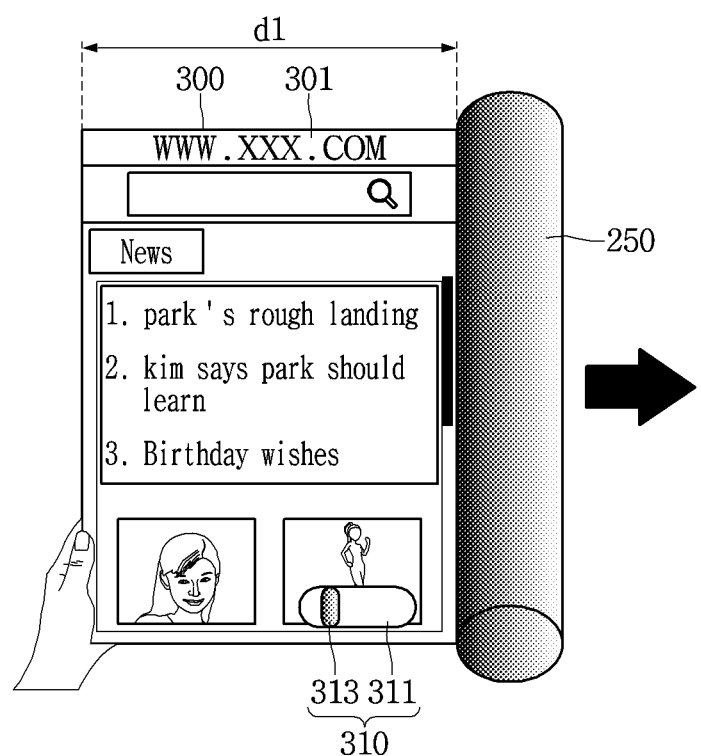
FIG. 6A, FIG. 6B, and FIG. 6C are views of displaying a first indicator for indicating the degree to which the screen of a display unit is expandable according to an embodiment of the present invention.
Figure 6B:
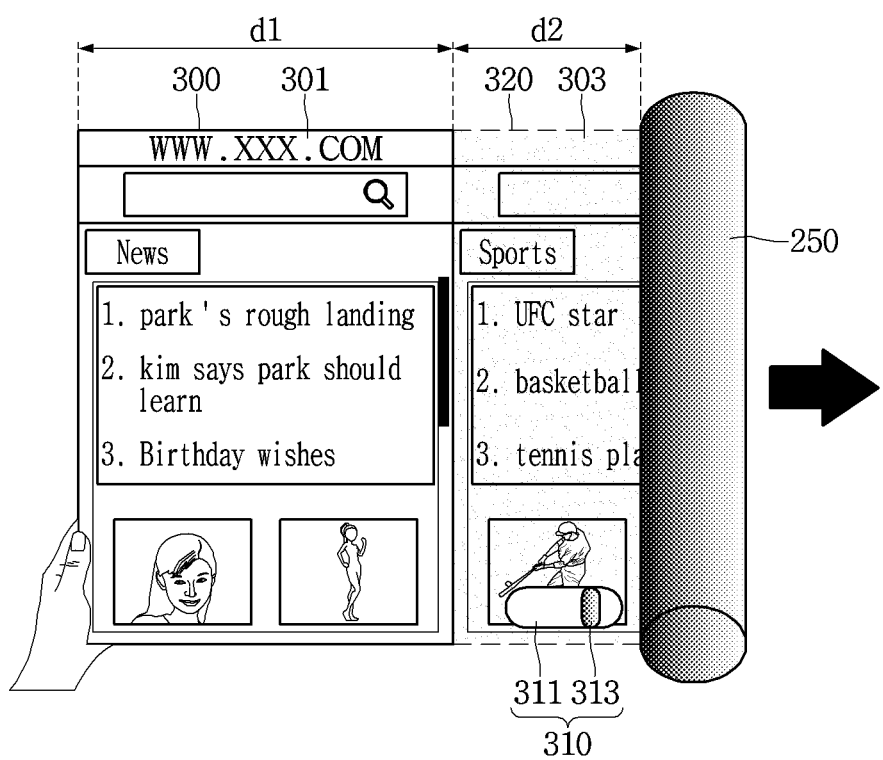
Figure 6C:
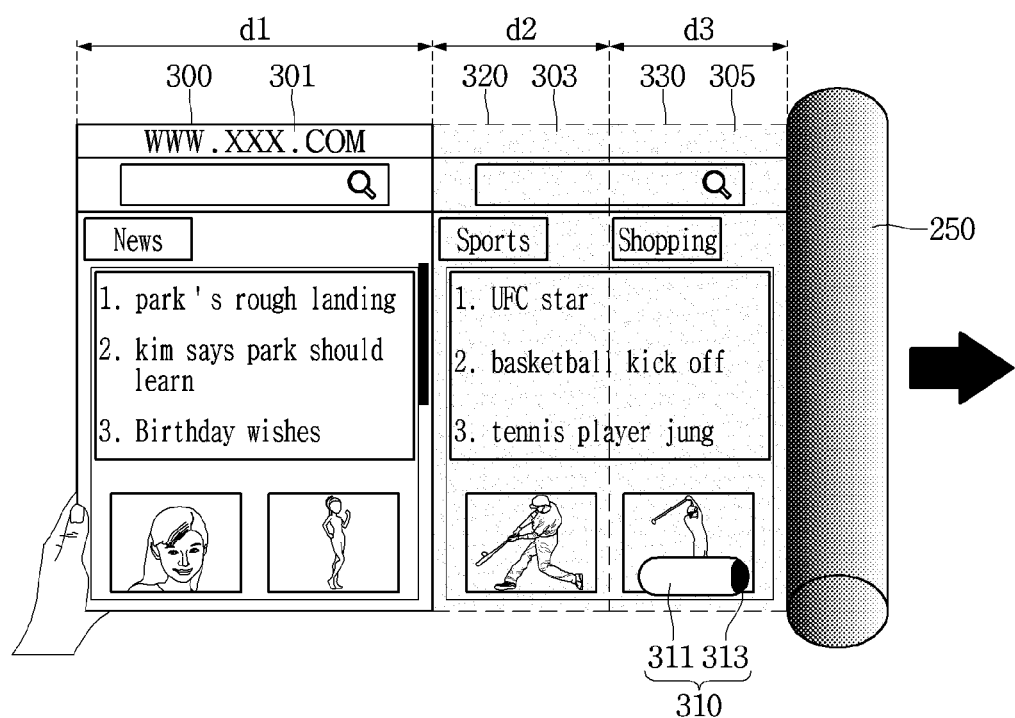

FIGS. 6A to 6C are views of displaying a first indicator for indicating the degree to which the screen of a display unit is expandable according to an embodiment of the present invention.

A rollable display device 200_2 is described as one example with reference to FIGS. 6A to 6C.

Referring to FIG. 6A, the screen of the display unit 250 of the rollable display device 200_2 may be in a state of being expanded in the +x axis direction by a first area 300 corresponding to a first distance d1. As another example, FIG. 6A may represent a state where the screen of the display unit 250 of the rollable display device 200_2 is not expanded. Hereinafter, it is assumed and described that the screen of the display unit 250 is expanded by the first area 300.

The content information 301 is displayed in the first area 300 where the screen that the display unit 250 displays is expanded. The content information 301 may be information provided from a webpage. The first indicator 310 for indicating the degree (or flexible degree) to which the screen of the display unit 250 is expanded or reduced may be displayed on the screen of the display unit 250. The first indicator 310 may include an expansion guide bar 311 for guiding the degree to which the screen of the display unit 250 is expanded to a maximum and a movement bar 313 disposed on the expansion guide bar 311 and indicating to what degree the screen of the display unit 250 is expanded currently. The movement bar 313 may be moved in the direction that the screen size of the display unit 250 is expanded. For example, when the screen of the display unit 250 is expanded in the +x axis direction, the movement bar 313 also may be moved on the expansion guide bar 311 in the +x axis direction.

When the screen of the display unit 250 in the +x axis direction is expanded in the state of FIG. 6A, the control unit 290, as shown in FIG. 6B, may expand the screen of the display unit 250 by a second area 320 corresponding to a second distance d2 in the +x axis direction. The control unit 290 may perform a control on the display unit 250 to display the content information 303 remaining in the expanded second area 320 as expanding the screen of the display unit 250 by the second area 320. Additionally, the control unit 290 may move the movement bar 313 of the first indicator 310 in the direction that the screen of the display unit 250 is expanded as expanding the screen of the display unit 250 by the second area 320.

When the screen of the display unit 250 in the +x axis direction is additionally expanded in the state of FIG. 6B, the control unit 290, as shown in FIG. 6C, may additionally expand the screen of the display unit 250 by a third area 330 corresponding to a third distance d3 in the +x axis direction. It is assumed that the case that the screen of the display unit 250 is expanded by the third area 330 is the case that the screen of the display unit 250 is expanded to the maximum. The control unit 290 may perform a control on the display unit 250 to display the content information 305 remaining in the expanded third area 330 as expanding the screen of the display unit 250 by the third area 330. Additionally, the control unit 290 may move the movement bar 313 of the first indicator 310 in the direction that the screen of the display unit 250 is expanded as expanding the screen of the display unit 250 by the third area 330. Since the screen of the display unit 250 is expanded to the maximum in FIG. 6C, the movement bar 313 also may be disposed at the rightmost position of the expansion guide bar 311. Moreover, when the screen of the display unit 250 is reduced in the −x axis direction is detected in FIG. 6C, the control unit 290 may move the movement bar 313 of the first indicator 310 in the −x axis direction as reducing the screen of the display unit 250. Accordingly, the screen of the display unit 250 may be reduced as shown in FIG. 6B or FIG. 6C and the movement bar 313 also may be moved in the screen reduction direction.

A user may intuitively check to which degree the screen of the display unit 250 is expanded or reduced through the first indicator 310.

Then, according to an embodiment of the present invention, displaying a second indicator for indicating the amount of remaining content information will be described.

Figure 7:
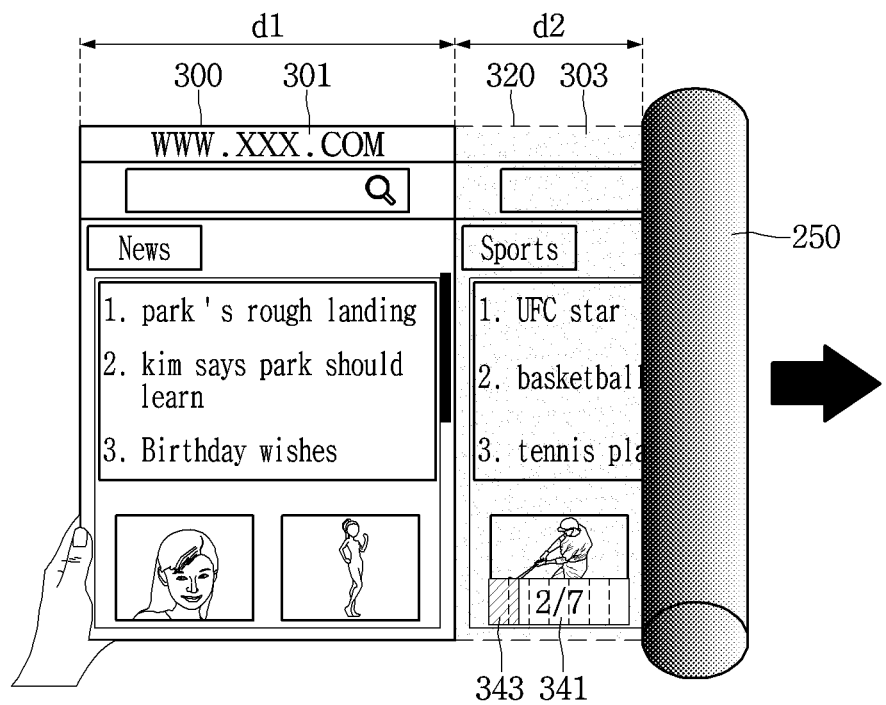
FIG. 7 is a view of displaying a second indicator for indicating the amount of remaining content information according to an embodiment of the present invention.

FIG. 7 is a view of displaying a second indicator for indicating the amount of remaining content information according to an embodiment of the present invention.

Referring to FIG. 7, the display unit 250 of the rollable display device 200_2 may be in a state of being expanded in the +x axis direction by a first area 300 corresponding to a first distance d1 and a second area 320 corresponding to a second distance d2. Partial content information 301 among the entire content information may be displayed in the first area 300 and another partial content information 303 among the entire content information may be displayed in the second area 320. The control unit 290 may display a second indicator 340 for indicating the amount of the remaining content information among the entire available content information, through the display unit 250. The second indicator 340 may include an entire information amount bar 341 for indicating the entire content information amount and a movement information bar 343 for indicating what degree of content information among the entire content information amount the current screen of the display unit 250 displays. When the entire content information is configured with a plurality of pages, the entire information amount bar 341 may include sub areas respectively corresponding to a plurality of pages. Each sub area may be identified by a dividing line (or dotted line). A page number (for example, 2/7) displayed on the current screen of the display unit 250 with respect to the entire page numbers may be further displayed on the second indicator 340.

The moving information bar 343 may be disposed on the entire information amount bar 341 and may indicate what extent information provided from a page displayed on the screen of the display unit 250 is displayed. For example, referring to FIG. 7, it is assumed that parts of the content information 301 corresponding to the first page and the content information 303 corresponding to the second page are displayed on the screen of the display unit 250. In this case, the movement information bar 343 may indicate that the entire content information 301 provided from the first page and part of the content information 303 provided from the second page are displayed. The movement information bar 343 may be moved in the direction that the screen size of the display unit 250 is reduced. That is, when the screen of the display unit 250 is reduced in the −x axis direction is detected, the control unit 290 may also move the movement information bar 343 in the −x axis direction as reducing the screen size of the display unit 250.

A user may easily check what information at a certain position he/she views currently and what degree the content information remains through the second indicator 340.

Figure 8A:
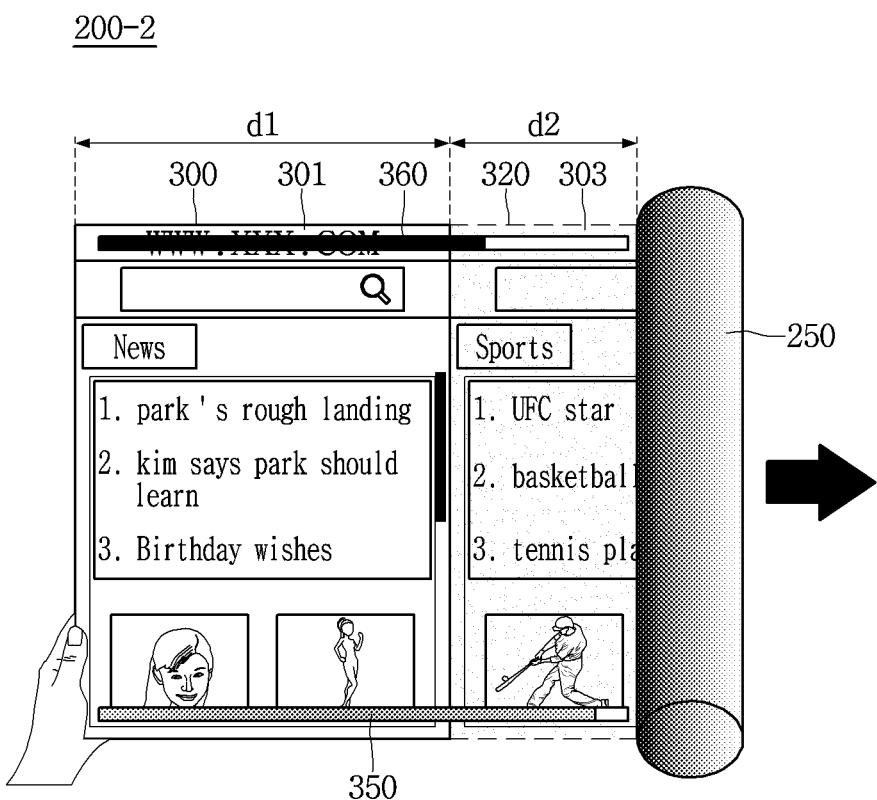
FIG. 8A and FIG. 8B are views illustrating a first indicator for indicating to which degree a screen of a display unit is expanded and a second indicator for indicating the amount of the remaining content information according to various embodiments of the present disclosure.
Figure 8B:
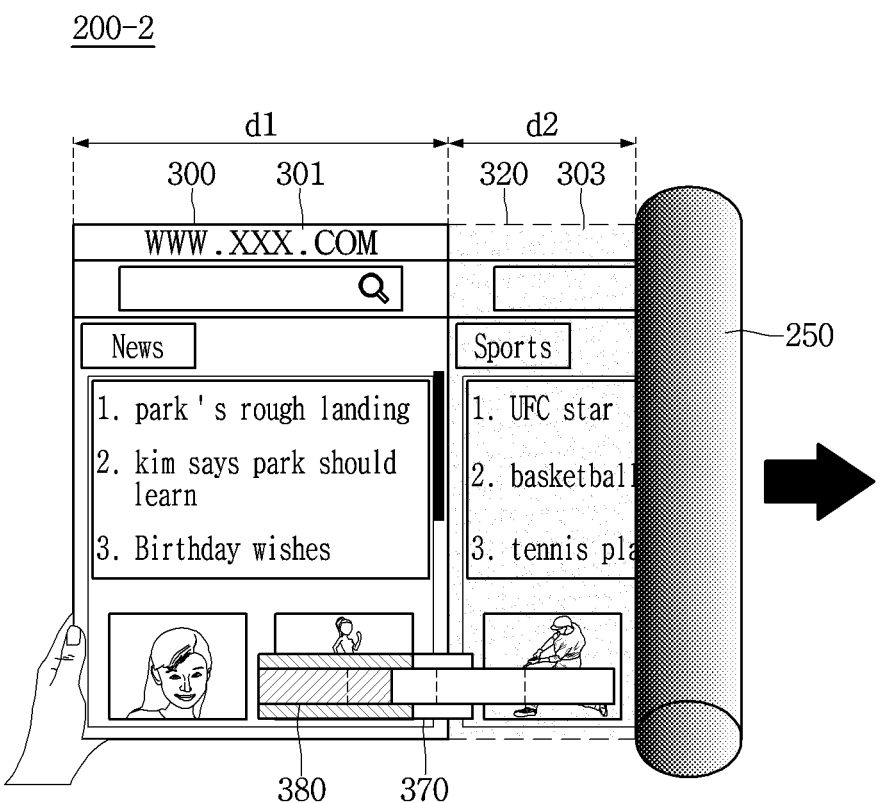

Then, FIGS. 8A and 8B are described.

FIGS. 8A and 8B are views illustrating a first indicator for indicating to which degree a screen of a display unit is expanded and a second indicator for indicating the amount of the remaining content information according to various embodiments of the present disclosure.

Referring to FIG. 8A, the display unit 250 of the rollable display device 200_2 may be in a state of being expanded in the +x axis direction by a first area 300 corresponding to a first distance d1 and a second area 320 corresponding to a second distance d2. Partial content information 301 among the entire content information may be displayed in the first area 300 and another partial content information 303 among the entire content information may be displayed in the second area 320. The control unit 290 may simultaneously display a first indicator 350 for indicating the degree to which the screen of the display unit 250 is expanded and a second indicator 360 for indicating the remaining content information amount. The color of the first indicator 350 and the color of the second indicator 360 may be different from each other. The first indicator 350 may be disposed at the lower end of the screen that the display unit 250 displays and the second indicator 360 may be disposed at the upper end of the screen that the display unit 250 displays. However, such an arrangement is just exemplary. The first indicator 350 may be displayed in a bar form for representing the currently expanded amount with respect to the amount in which the screen of the display unit 250 is expanded to the maximum. The second indicator 360 also may be displayed in a form for representing the information amount currently displayed on the screen of the display unit 250 with respect to the entire available content information amount.

Referring to FIG. 8B, the first indicator 370 and the second indicator 380 may be displayed to overlap each other. That is, the second indicator 380 may overlap the upper side of the first indicator 370 and may be displayed.

The first indicator 370 may be displayed in a bar form for representing the currently expanded amount with respect to the amount in which the screen of the display unit 250 is expanded to the maximum. The second indicator 380 may be displayed in a form for representing the information amount currently displayed on the screen of the display unit 250 with respect to the entire available content information amount. A plurality of sub areas are separated on the second indicator 380 to identify a plurality of pages configuring the entire content information and what extend the current content information amount is displayed.

A user may easily check what extend the screen of the display unit 250 is expanded and what extend the remaining content information amount is at the same time through the first indicator and the second indicator.

Figure 9A:
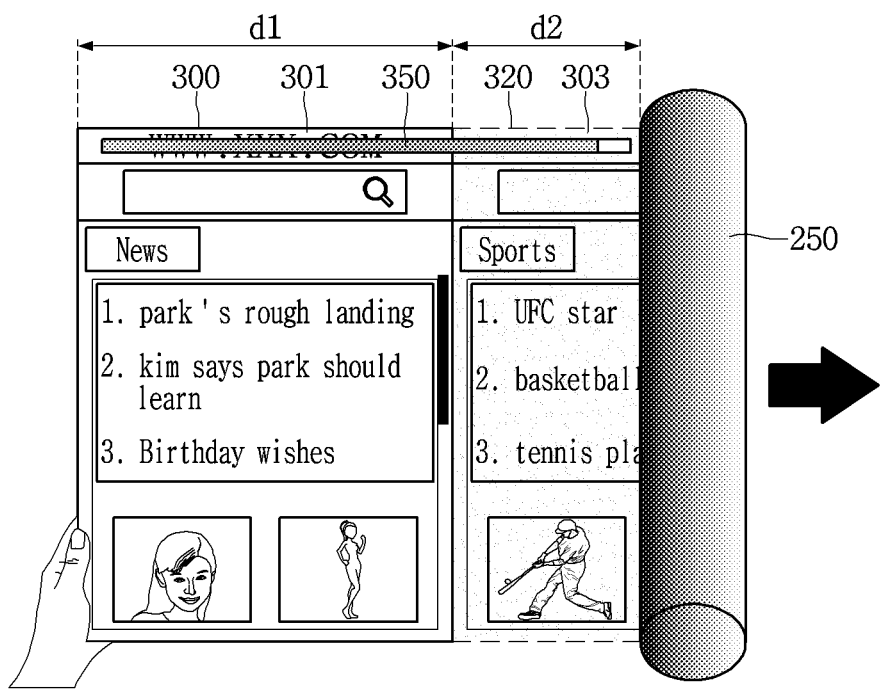
FIG. 9A and FIG. 9B are views of displaying one of a first indicator and a second indicator according to expanding or reducing a screen of a display unit is maintained.
Figure 9B:
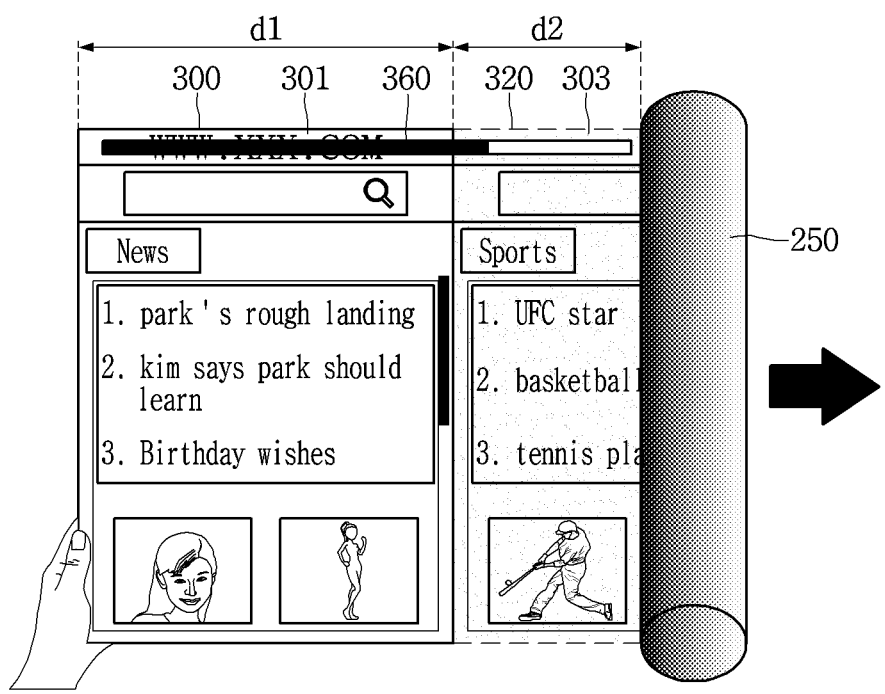

Then, FIGS. 9A and 9B are described.

FIGS. 9A and 9B are views of displaying one of a first indicator and a second indicator according to expanding or reducing a screen of a display unit is maintained.

Especially, FIG. 9A is a view of displaying the first indicator 350 while expanding or reducing the screen of the display unit 250 and FIG. 9B is a view of displaying the second indicator 350 when the screen of the display unit 250 is not expanded or reduced.

Referring to FIG. 9A, when the control unit 290 can detect that the screen of the display unit 250 is expanded and, control the display unit 250 to display the first indicator 350 for indicating what extend the screen of the display unit 250 is expanded currently with respect to the degree to which the screen of the display unit 250 is expanded to the maximum. If expansion or reduction of the screen of the display unit 250 is not detected for a predetermined time, the control unit 290, as shown in FIG. 9B, can control the display unit 250 to display the second indicator 360 for indicating the content information amount displayed on the current screen of the display unit 250 with respect to the entire content information amount.

Although the case that the screen of the display unit is expanded is described with reference to FIGS. 9A and 9B that, this may be applied to the case that the screen of the display unit 250 is reduced. That is, when reduction of the screen of the display unit 250 is detected, the first indicator 350 may be displayed and reduction of the screen of the display unit 250 is not detected, the second indicator 360 may be displayed.

An indicator for indicating the degree to which the screen of the display unit 250 is expanded or reduced and an indicator for indicating the remaining content information amount may be applied to a stretchable display device 200-1.

Figure 10A:
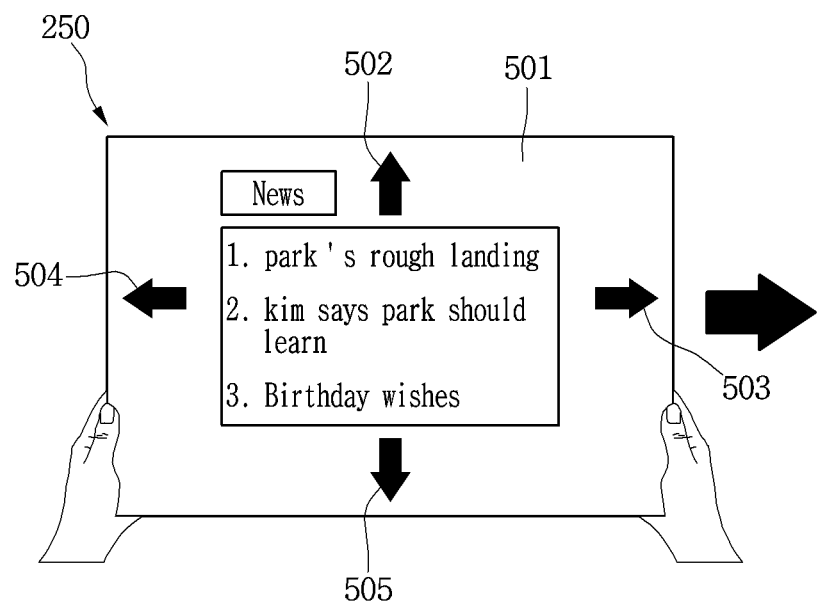
FIG. 10A, FIG. 10B, and FIG. 10C are views of displaying a first indicator in a stretchable display device according to another embodiment of the present invention.
Figure 10B:
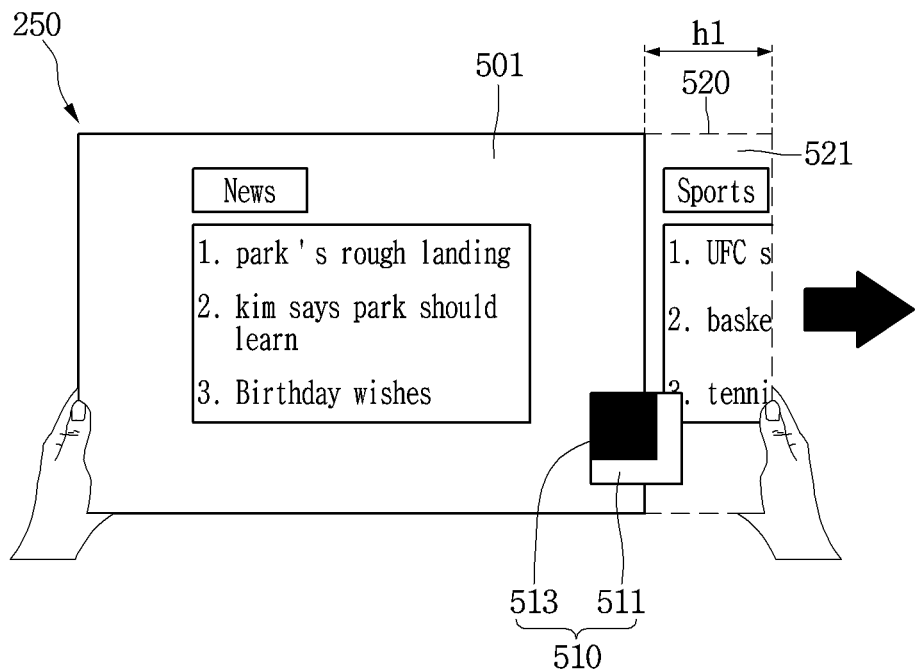
Figure 10C:
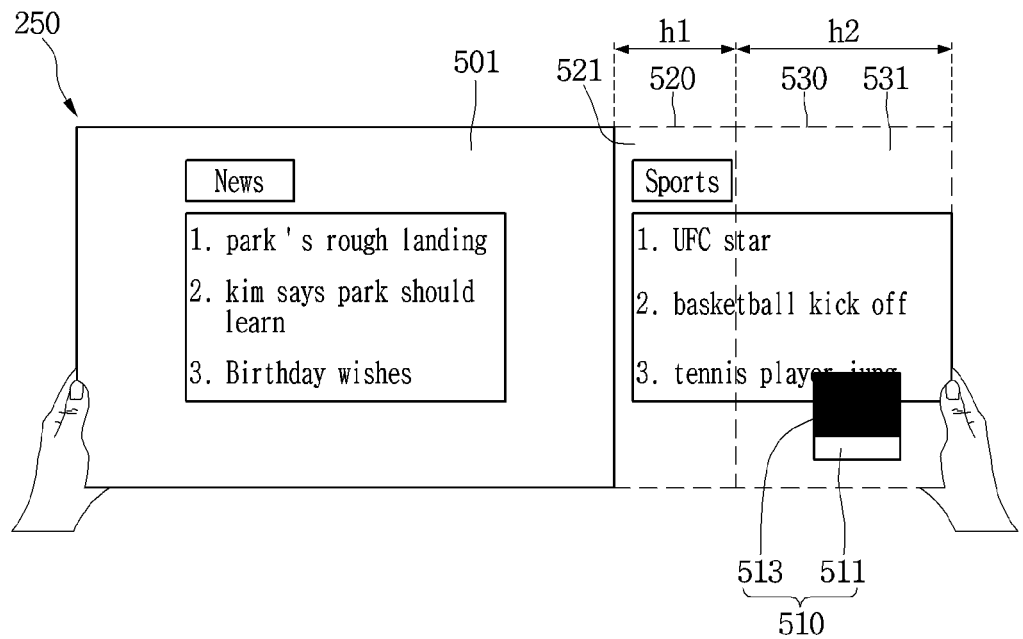

FIGS. 10A to 10C are views of displaying a first indicator in a stretchable display device according to another embodiment of the present invention.

Referring to FIG. 10A, the screen of the display unit 250 of the stretchable display device 200_1 is in a state before it is expanded or reduced to a default screen. Partial content information 501 is displayed on the screen of the display unit 250. When the display unit 250 in the +x axis direction is expanded in this state, the control unit 290 can control the display unit 250 to display a plurality of notification indicators 502 to 505 for indicating directions in which the screen of the display unit 250 is stretched. According to detecting that the screen of the display unit 150 is expanded in the +x axis direction, as shown in FIG. 10B, the screen of the display unit 250 may be expanded by a first area 520 corresponding to a first distance h1. The control unit 290 may display additional content information 521 in the expanded first area 520 as expanding the screen of the display unit 250 by the first area 520. Additionally, at the same time, the control unit 290 may perform a control on the display unit 250 to display a first indicator 510 for indicating the degree to which the screen of the display unit 250 is expanded or reduced. The first indicator 510 may include a stretch fixed box 511 for indicating the degree to which the screen of the display unit 250 is expanded or reduced and a stretch state box 513 for indicating to which degree the current screen of the display unit 250 is expanded or reduced. The stretch state box 513 may change its form in correspondence to the direction and expansion or reduction of the screen of the display unit 250. That is, as the display unit 250 is expanded in the +x axis direction, the screen of the display unit 250 may be expanded by the first area 520 and correspondingly, an area that the stretch state box 513 occupies may be also increased in a corresponding direction. A user may easily check to which degree the screen of the display unit 250 is expanded or reduced through the first indicator 510.

When the display unit 250 is additionally expanded in the +x axis direction in the state of FIG. 10B, the control unit 290, as shown in FIG. 10C, may expand the screen of the display unit 250 by a second area 530 corresponding to a second distance d2 and display the content information 531 remaining in the expanded second area 530. At the same time, the control unit 290 may increase the area that the stretch state box 513 occupies by an area corresponding to the second area 530. When it is assumed in FIG. 10C that the screen of the display unit 250 is expanded to the maximum in the +x axis direction, the color of the stretch state box 513 may be different from the color the stretch state box 513 shown in FIG. 10B. For example, if the color of the stretch state box 513 shown in FIG. 10B is orange color, as the screen of the display unit 250 is expanded to the maximum in a specific direction, the color of the stretch state box 513 may be changed into red color.

The first indicator 310 shown in FIGS. 6A to 6C may be applied as it is in the case of the stretchable display device 200_1. In relation to the stretchable display device 200_1, the screen of the display unit 250 may be expanded in the −x axis direction, and thus the first indicator 310 may be displayed also.

Figure 11A:
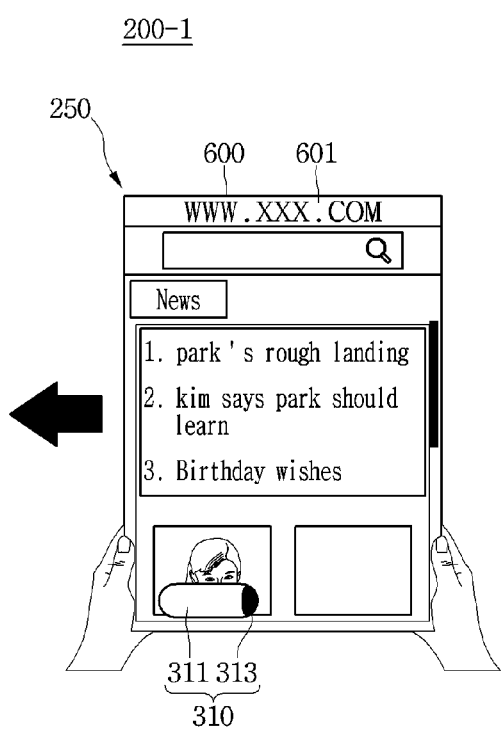
FIG. 11A, FIG. 11B, and FIG. 11C are views of displaying a first indicator in a stretchable display device according to another embodiment of the present invention.
Figure 11B:
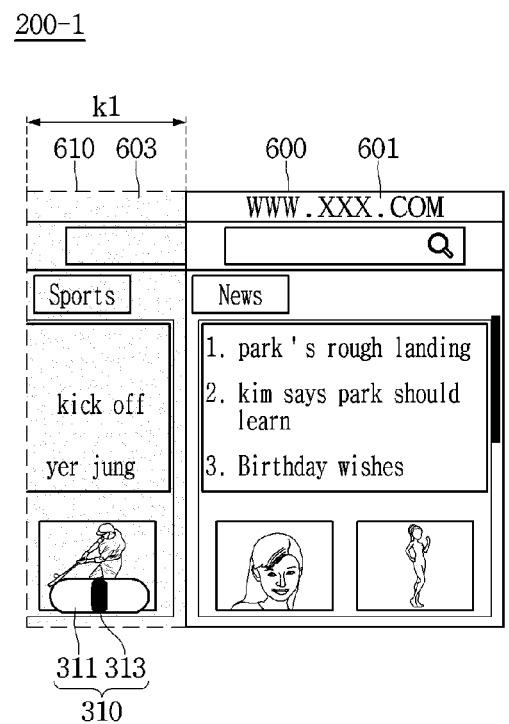
Figure 11C:
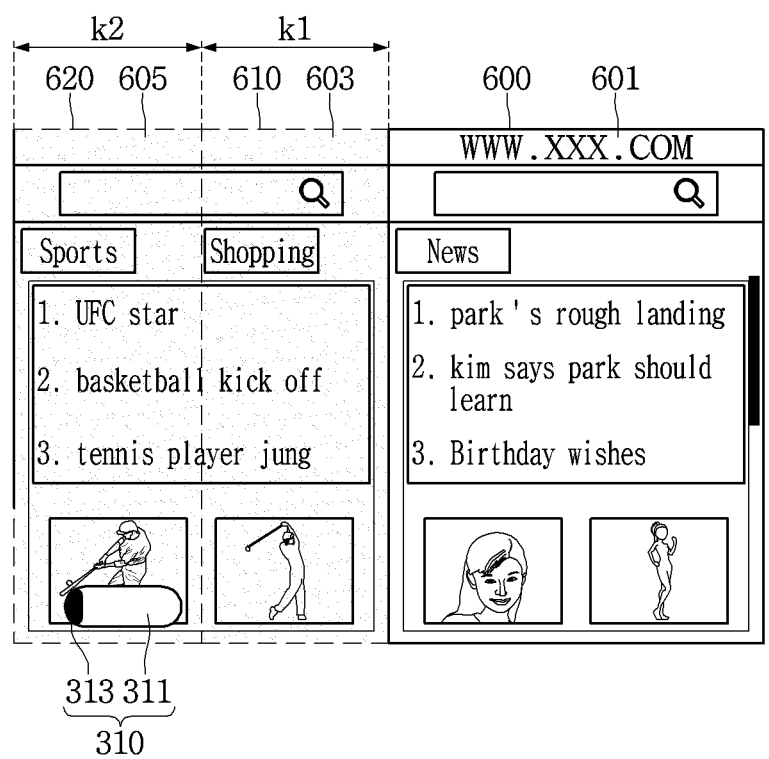

FIGS. 11A to 11C are views of displaying a first indicator in a stretchable display device according to another embodiment of the present invention.

Referring to FIG. 11A, the screen of the display unit 250 of the stretchable display device 200_1 is in a state before it is expanded or reduced to a default screen. Partial content information 501 is displayed on the screen of the display unit 250. Additionally, the control unit 290 may display a first indicator 310 for indicating the degree to which the screen of the display unit 250 is expanded. According to expanding the screen of the display unit 250 in the −x axis direction, as shown in FIG. 11B, the screen of the display unit 250 may be expanded by a first area 610 corresponding to a first distance k1. The control unit 290 may display additional content information 603 in the expanded first area 610 as expanding the screen of the display unit 250 by the first area 610. At the same time, the control unit 290 may move the movement bar 313 of the first indicator 310 in the direction (e.g., −x axis direction) that the screen of the display unit 250 is expanded as expanding the screen of the display unit 250 by the first area 610. When the screen of the display unit 250 is additionally expanded in the −x axis direction is detected in the state of FIG. 11B, the control unit 290, as shown in FIG. 11C, may additionally expand the screen of the display unit 250 by a second area 620 corresponding to a second distance k2 in the −x axis direction. It is assumed that the case that the screen of the display unit 250 is expanded by the third area 330 is the case that the screen of the display unit 250 is expanded to the maximum. The control unit 290 may perform a control on the display unit 250 to display the content information 305 remaining in the expanded third area 330 as expanding the screen of the display unit 250 by the third area 330. Additionally, the control unit 290 may move the movement bar 313 of the first indicator 310 in the direction that the screen of the display unit 250 is expanded as expanding the screen of the display unit 250 by the second area 620. Since the screen of the display unit 250 is expanded to the maximum in FIG. 11C, the movement bar 313 also may be disposed at the leftmost position of the expansion guide bar 311.

Again, FIG. 5 is described.

Then, the control unit 290 checks whether the screen of the display unit 250 is expanded to the maximum in operation S109 and checks whether there is remaining content information to be displayed when the screen of the display unit 250 is expanded to the maximum in operation S111.

If there is remaining content information to be displayed, the control unit 290 detects that the screen of the display unit 250 is additionally expanded in a specific direction in operation S113 and sequentially displays the remaining content information on the screen of the display unit 250 that is expanded to the maximum in operation S115. According to an embodiment of the present invention, when the screen of the display unit 250 is expanded to the maximum and content information to be displayed remains and the screen of the display unit 250 is expanded that is detected, the control unit 290 may make existing displayed content information disappear sequentially and may display the remaining content information. This will be described with reference to the accompanying drawings.

Figure 12A:
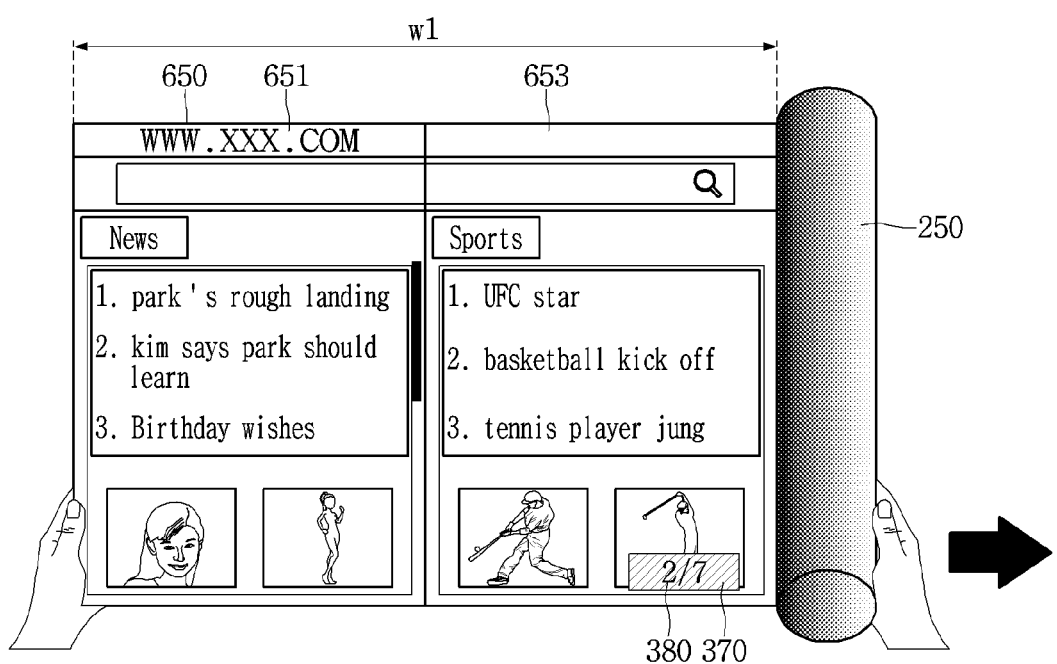
FIG. 12A, FIG. 12B, and FIG. 12C are views of displaying remaining content information when there is remaining content information to be displayed in a state where the screen of a display unit is expanded to the maximum and expansion of the screen of the display unit is detected.

FIGS. 12A and 18B are views of displaying remaining content information when there is remaining content information to be displayed in a state where the screen of a display unit is expanded to the maximum and an expansion of the screen of the display unit is detected.

Figure 12B:
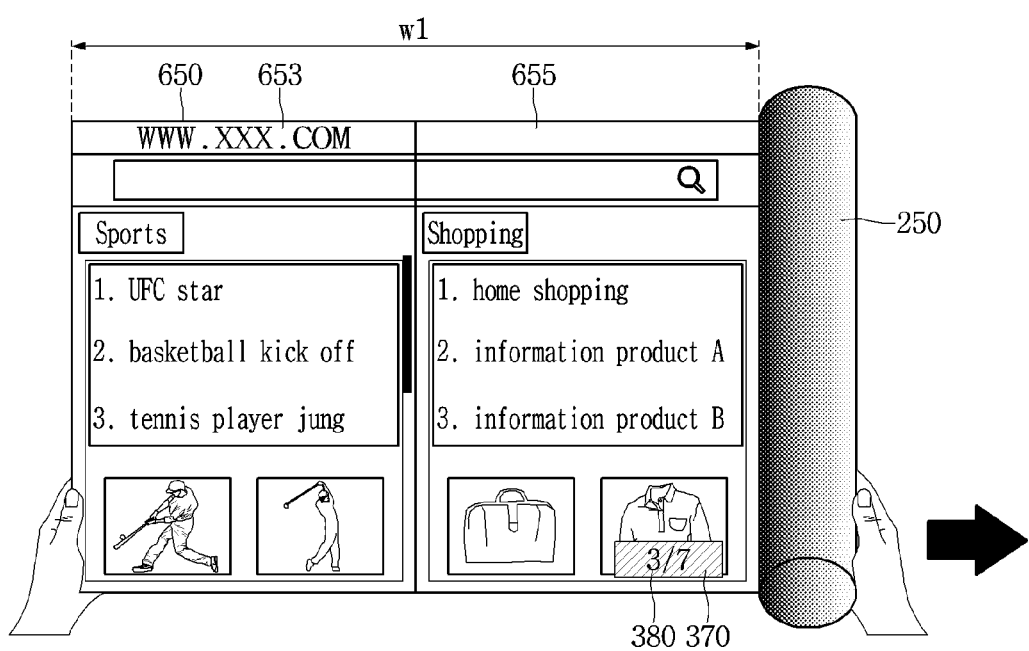

Referring to FIG. 12A, the screen of a display unit 250 of a rollable display 200_2 is expanded to the maximum size. That is, the screen of the display unit 250 is in a state of being expanded by the maximum expansion area 650 corresponding to the maximum expansion distance w1. A first indicator 370 for indicating the degree to which the screen of the display unit 250 is expanded and a second indicator 380 for indicating the remaining content information amount may be displayed on the screen of the display unit 250. The first indicator 370 of FIG. 12A indicates a state where the screen of the display unit 250 is expanded to the maximum and the second indicator 380 may indicate a currently displayed page number (page 2 of 7, 2/7) among the entire pages in a text form. That is, the first page 651 and the second page 653 among total seven pages are displayed in the maximum expansion area 650. In this state, when the control unit 290 detects that the screen of the display unit 250 is expanded, the control unit 290, as shown in FIG. 12B, can control the display unit 250 to sequentially display not-displayed pages in the maximum expansion area 650. That is, the control unit 290 may perform a control on the display unit 250 to move the second page 653 in display to the left and display the third page 655 that is the next page not displayed before on the right of the second page 653. At this point, the first page 651 disappears. Additionally, as the third page 655 is displayed in the maximum expansion area 650, the control unit 290 may change the second indicator 380 with <3/7> in order to indicate that the third page 655 is being displayed.

Figure 12C:
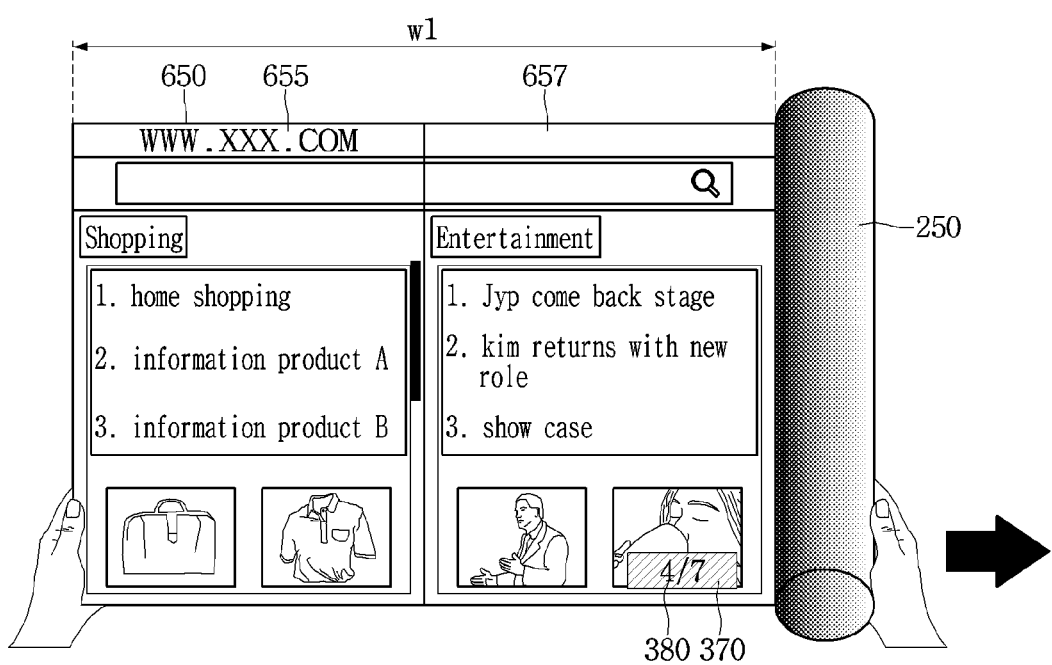

In the same manner, when the control unit 290 detects that the screen of the display unit 250 is expanded in FIG. 12B, the control unit 290, as shown in FIG. 12C, may perform a control on the display unit 250 to sequentially display not-displayed pages in the maximum expansion area 650. That is, the control unit 290 may perform a control on the display unit 250 to move the third page 655 in display to the left and display the fourth page 657 that is the next page not displayed before on the right of the third page 655. At this point, the second page 653 disappears. Additionally, as the fourth page 657 is displayed in the maximum expansion area 650, the control unit 290 may change the second indicator 380 with <4/7> in order to indicate that the fourth page 657 is being displayed.

Again, FIG. 5 is described.

On the other hand, if there is content information to be displayed and expansion of the screen of the display unit 250 in a specific direction is not detected, the control unit 290 displays at least one view icon in operation S117. According to an embodiment of the present invention, the view icon may be a reduction view icon for reducing and displaying remaining content information in the maximum expansion area of the screen of the display unit 250.

According to another embodiment of the present invention, the view icon may be an icon for providing only summarized information among the entire content information.

According to another embodiment of the present invention, the view icon may be an icon for providing the most viewed article when content information is news articles, an icon for providing an interest that is pre-registered by a user, or a view for providing articles provided as images.

According to another embodiment of the present invention, the view icon may be a landscape view icon for providing content information to be suitable for horizontal view or a portrait view icon for providing content information to be suitable for vertical view. Operation 5117 will be described below with reference to the accompanying drawings.

Figure 13A:
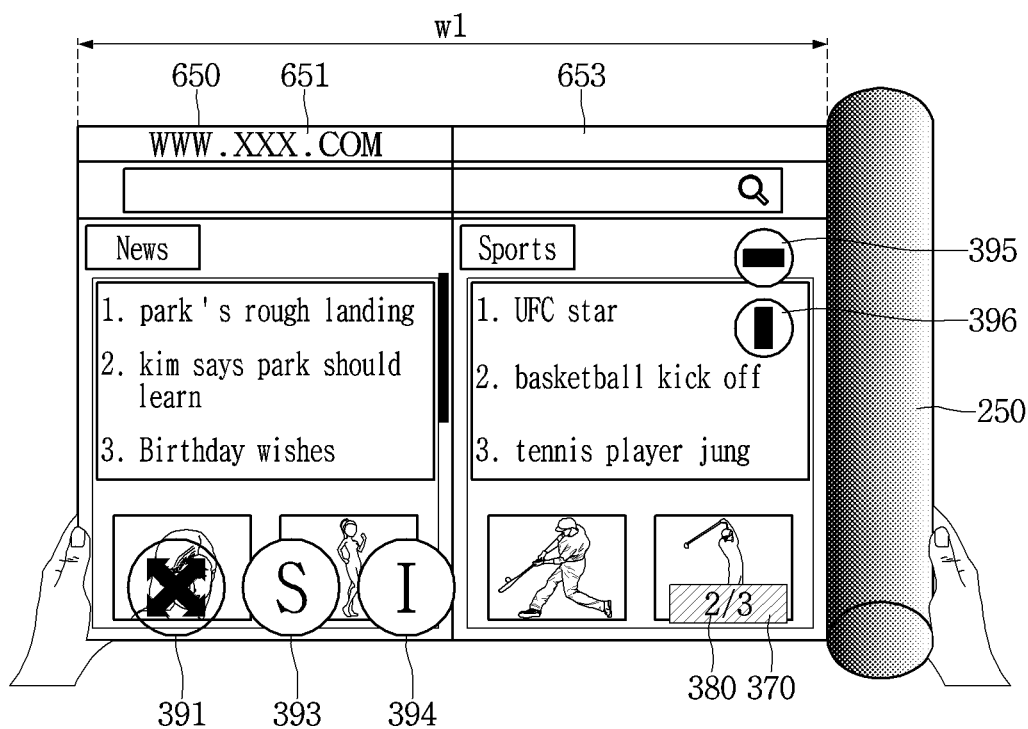
FIG. 13A, FIG. 13B, and FIG. 13C are views illustrating a scenario that is provided as at least one view icon is selected when there is remaining content information to be displayed in a state where the screen of a display unit is expanded to the maximum according to various embodiments of the present invention.
Figure 13B:
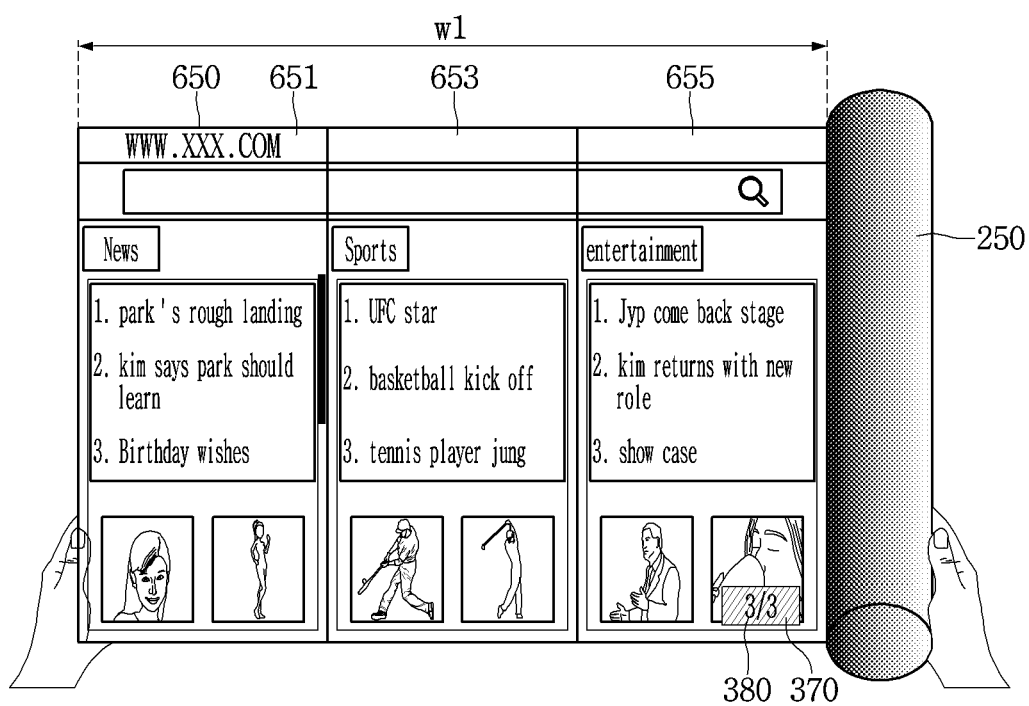
Figure 13C:
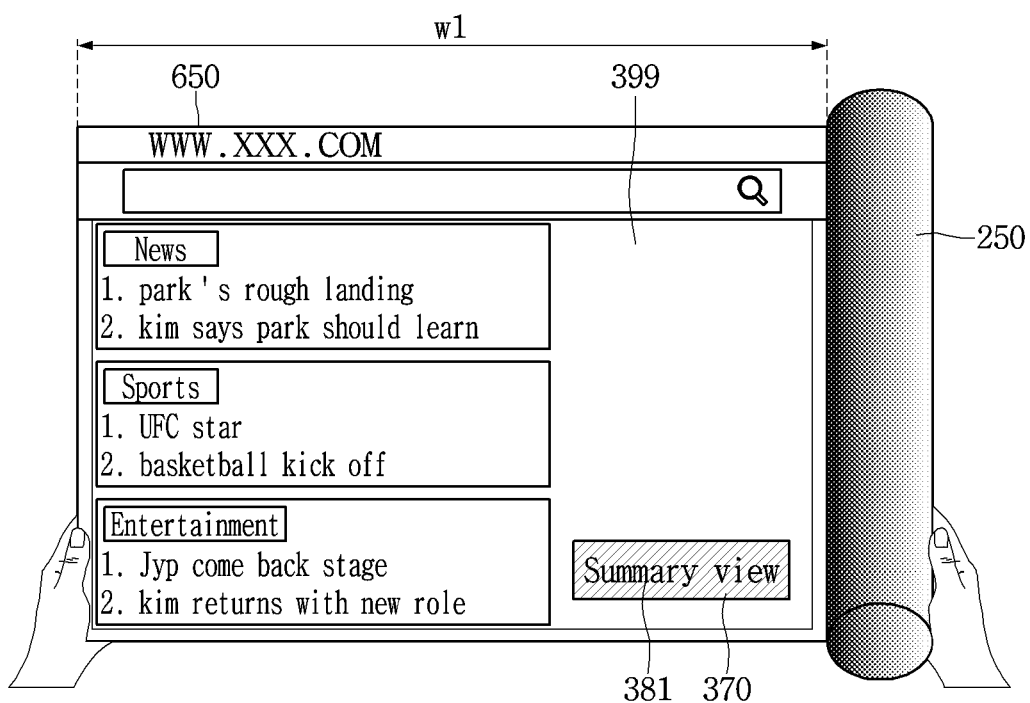

FIGS. 13A to 13C are views illustrating a scenario that is provided as at least one view icon is selected when there is remaining content information to be displayed in a state where the screen of a display unit is expanded to the maximum according to various embodiments of the present invention.

Referring to FIG. 13A, the screen of a display unit 250 of a rollable display 200_2 is expanded to the maximum size. That is, the screen of the display unit 250 is in a state of being expanded by the maximum expansion area 650 corresponding to the maximum expansion distance w1. A first indicator 370 for indicating the degree to which the screen of the display unit 250 is expanded and a second indicator 380 for indicating the remaining content information amount may be displayed on the screen of the display unit 250. The first indicator 370 of FIG. 13A indicates a state where the screen of the display unit 250 is expanded to the maximum and the second indicator 380 may indicate a currently displayed page number (page 2 of 3, 2/3) among the entire pages in a text form. That is, the first page 651 and the second page 653 among total three pages are displayed in the maximum expansion area 650. Additionally, when the screen of the display unit 250 is expanded to the maximum size, the control unit 290 may display at least one of a reduction view icon 391, a summary view icon 393, an image view icon 394, a landscape view icon 395, and a portrait view icon 396, on the screen. The reduction view icon 391 may be an icon for reducing and displaying the entire content information in the maximum expansion area 650. The summary view icon 393 may be an icon for summarizing and providing the total content information. The image view icon 394 may be an icon for providing only image related information among content information. The landscape view icon 395 may be an icon for switching and providing the screen of the display unit 250 in landscape. The portrait view icon 396 may be an icon for switching and providing the screen of the display unit 250 in portrait.

When a request for selecting the reduction view icon 391 is received, the control unit 290, as shown in FIG. 13B, may perform a control on the display unit 250 to reduce the displayed first page 651 and second page 653 and reduce the not-displayed remaining third page 655 to display them in the maximum expansion area 650. At the same time, the control unit 290 may change the second indicator 380 with <3/3> in order to indicate that all pages are being displayed as the entire content information (that is, total three pages) is displayed in the maximum expansion area 650.

On the other hand, when a request for selecting the summary view icon 393 is received, the control unit 290, as shown in FIG. 13C, may perform a control on the display unit 250 to display summary information 399 that is obtained by summarizing information provided from each page in the maximum expansion area 650. At the same time, the control unit 290 may change the indicator 381 into <summary view> in order to indicate that information provided from all pages is displayed as summarized information. The summary information 399 may include at least one of the most viewed information on each page and information on user's interest.

On the other hand, the image view icon 394 may be an icon for displaying information provided through an image among information provided from each page. When a request for selecting the image view icon 394 is received, the control unit 290 may perform a control on the display unit 250 to extract only information provided through an image from information provided from each page and display the extracted information in the maximum expansion area 650.

When a request for selecting the landscape view icon 395 is received, the control unit 290 may perform a control to switch and display the screen of the display unit 250 in landscape. When a request for selecting the portrait view icon 396 is received, the control unit 290 may perform a control to switch and display the screen of the display unit 250 in portrait.

Again, FIG. 5 is described.

On the other hand, when the screen of the display unit 250 is not expanded to the maximum in operation S109, the control unit 190 checks whether all the remaining content information is displayed in operation 5119.

If all the remaining content information is displayed, the control unit 290 detects that the screen of the display unit 250 is additionally expanded in operation 5121 and displays related information relating to content information on an area that is expanded according to a detected result in operation 5123.

According to an embodiment of the present invention, the related information may be an edit icon for editing and providing all content information displayed in an area where the screen of the display unit 250 is expanded to the maximum.

According to another embodiment of the present invention, the related information may include information on an application relating to the content information displayed on the screen of the display unit 250. Operations 5121 to 5123 will be described below with reference to the accompanying drawings.

Figure 14A:
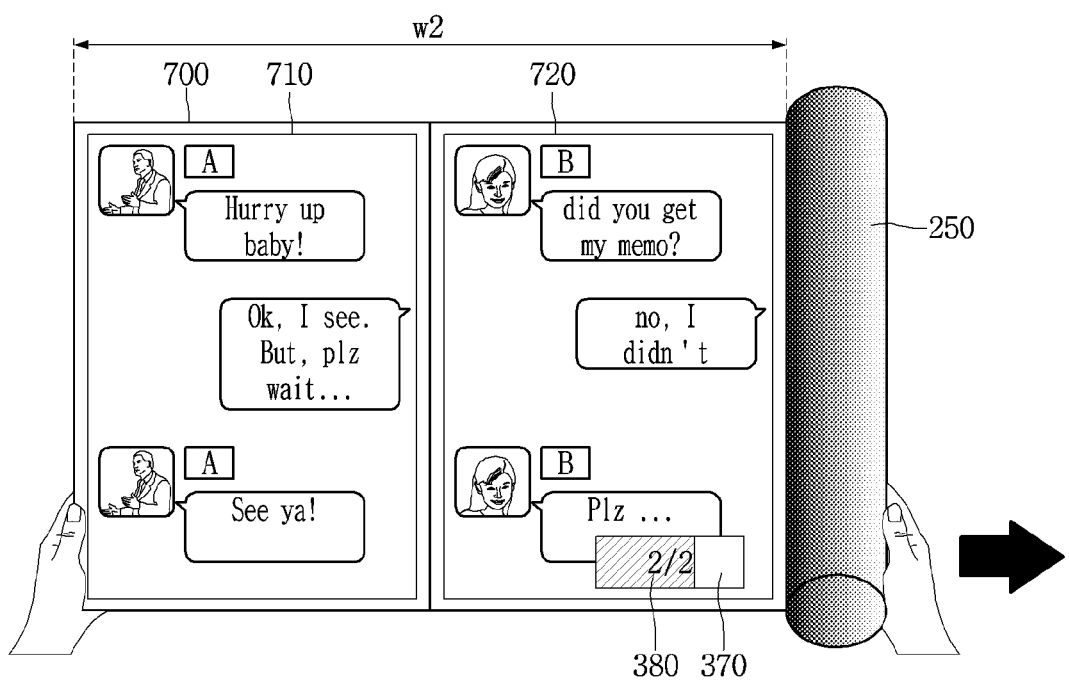
FIG. 14A, FIG. 14B, FIG. 14C, and FIG. 14D are views of describing related information provided to an expanded area according to detecting that the screen of the display is additionally expanded in a state where the screen of the display unit is not expanded to the maximum and all content information is displayed according to various embodiments of the present invention.
Figure 14B:
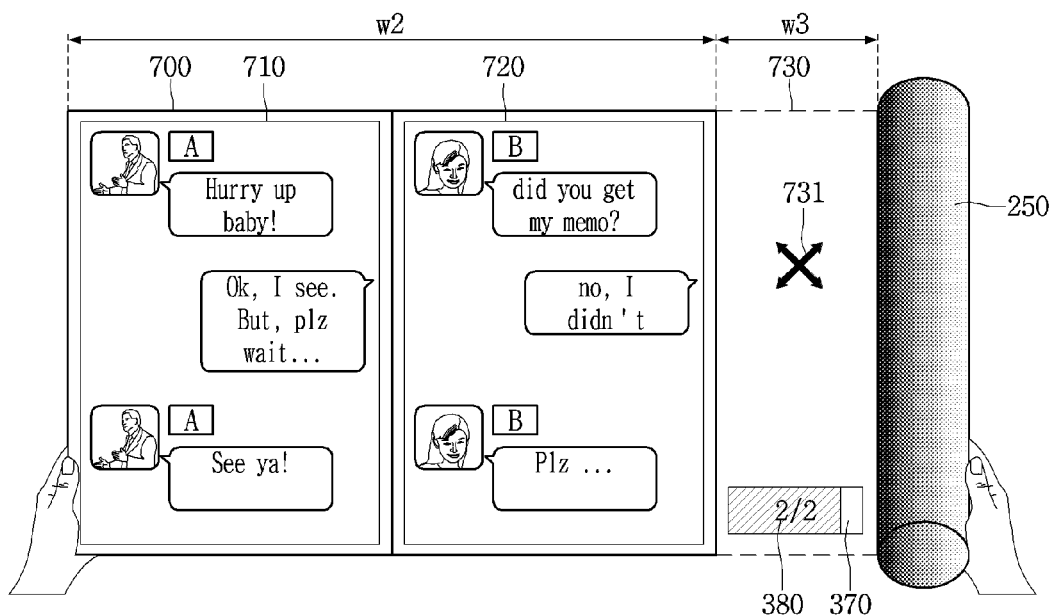
Figure 14C:
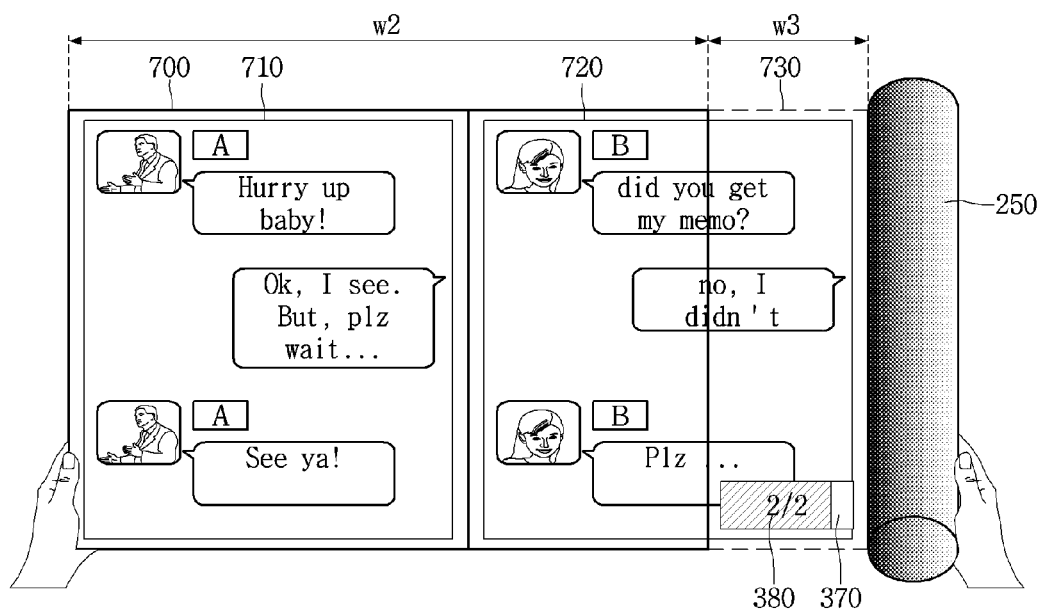
Figure 14D:
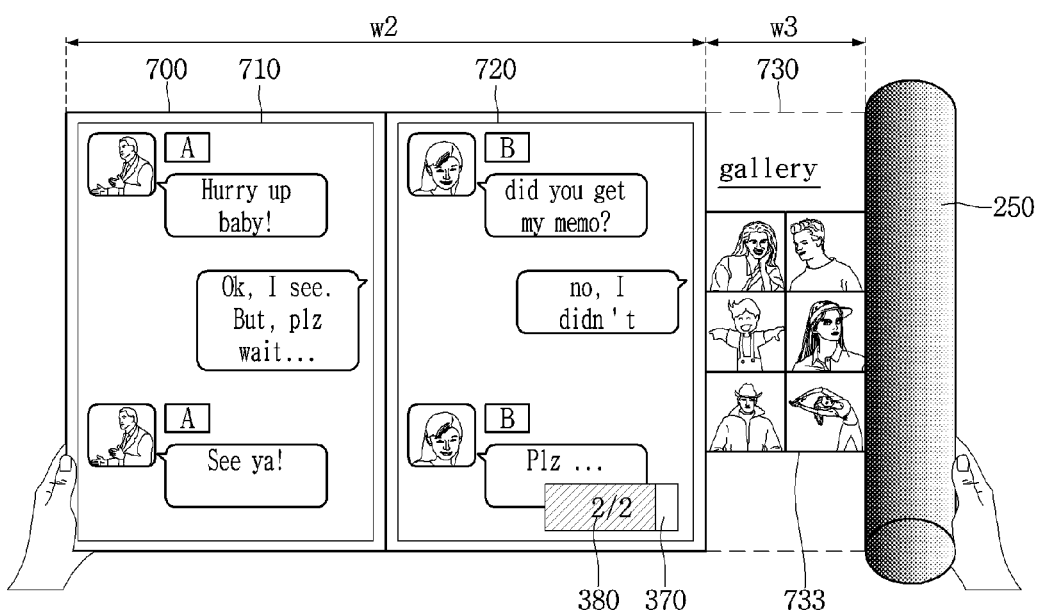

FIGS. 14A and 14D are views of describing related information provided to an expanded area according to detecting that the screen of the display unit is additionally expanded in a state where the screen of the display unit is not expanded to the maximum and all content information is displayed according to various embodiments of the present invention.

Referring to FIG. 14A, the screen of the display unit 250 of the rollable display device 200_2 may be in a state of being expanded in the +x axis direction by an area 700 corresponding to a distance w2. A first dialog window 710 and a second dialog window 720, which are provided from a mobile message application, may be displayed in the expanded area 700. Additionally, if there are only two dialog windows, an indicator 380 for indicating the number of currently displayed dialog windows among total dialog windows may be displayed with <2/2>. Additionally, an indicator 370 for indicating a currently expanded state with respect to the degree to which the screen of the display unit 250 is expanded to the maximum may be displayed. FIG.

14A is a view when all content information is displayed and the screen of the display unit 250 is not expanded to the maximum.

When the control unit 290 detects that the screen of the display unit 250 is additionally expanded in the +x axis direction in this state, the control unit 290, as shown in FIG. 14B, may additionally expand the screen of the display unit 250 by an area 730 corresponding to a distance w3. At the same time, the control unit 290 may perform a control on the display unit 250 to display an enlargement icon 731 for indicating that the first dialog window 710 and the second window dialog 720 are enlarged to correspond to the screen of the display unit 250 and displayed in the expanded area 730. According to another embodiment of the present invention, when all content information, that is, the first dialog window 710 and the second dialog window 720, is displayed, the enlargement icon 731 may be displayed even if the control unit 290 does not detect that the screen of the display unit 250 is additionally expanded.

When a request for selecting the enlargement icon 731 is received, the control unit 290, as shown in FIG. 14C, may perform a control on the display unit 250 to enlarge and display the first window dialog 710 and the second dialog window 720 in the expanded areas 700 and 730.

According to another embodiment of the present invention, when the control unit 290 detects that the screen of the display unit 250 is additionally expanded in the +x axis direction in FIG. 14A, as shown in FIG. 14C, the control unit 290 does not display the enlargement icon 731, and expands and displays the first dialog window 710 and the second dialog window 720 as additionally expanding the screen of the display unit 250 by an area 730 corresponding to a distance w3.

According to another embodiment of the present invention, in a state where the screen of the display unit is not expanded to the maximum and all content information is displayed, if the control unit 290 detects that the screen of the display unit is additionally expanded, information on an application relating to the content information displayed in the expanded area may be provided.

Referring to FIG. 14D, when the control unit 290 detects that the screen of the display unit 250 is additionally expanded in the +x axis direction in the state of FIG. 14A, the control unit 290, as shown in FIG. 14D, may additionally expand the screen of the display unit 250 by an area 730 corresponding to a distance w3. At the same time, the control unit 290 may perform a control on the display unit 250 to display information 730 on an application relating to content information in the expanded area 730. Since the first dialog window 710 and the second dialog window 720, that is, an execution screen of a mobile message application, are displayed in the area 700, the control unit 290 may display the execution screen 733 of a gallery application that is highly related to a mobile message application. When a mobile message application is executed, the related application may be the most frequently used application among applications used together. A plurality of pictures that are sharable with other users may be displayed in the execution screen 733 of the gallery application. A user may share at least one of a plurality of pictures with another user by using at least one of the first dialog window 710 and the second dialog window 720.

According to another embodiment of the present invention, when an image is displayed on the screen of the display unit 250, the rollable display device 200_2 may display an indicator for indicating the degree to which the screen of the display unit 250 is expanded and an indicator for indicating a displayed part in the entire image.

FIGS. 15A to 15D are views of displaying an indicator for indicating the degree to which the screen of a display unit is expanded and an indicator for indicating a displayed part in the entire image when the screen of the display unit is displayed according to an embodiment of the present invention.

Figure 15A:
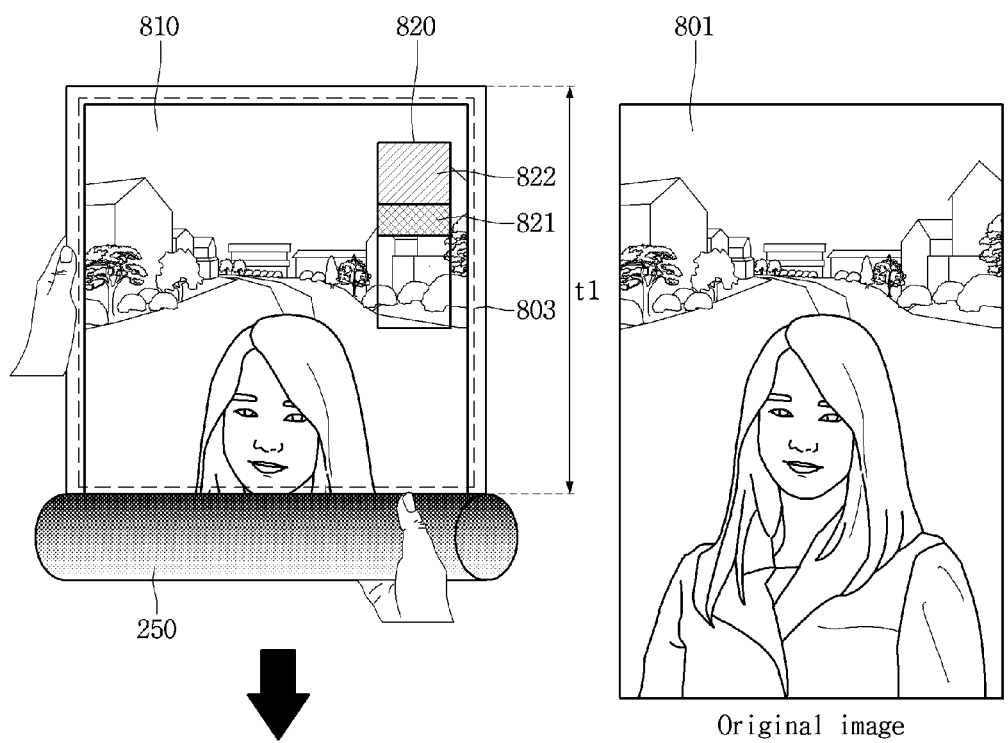
FIG. 15A, FIG. 15B, FIG. 15C, and FIG. 15D are views of displaying an indicator for indicating the degree to which the screen of a display unit is expanded and an indicator for indicating a displayed part in the entire image when the screen of the display unit is displayed according to an embodiment of the present invention.

Referring to FIG. 15A, an original image 801 is shown. As the screen of the display unit 250 of the rollable display device 200_2 is expanded by an area 803 corresponding to a distance t1, the control unit 290 may perform a control on the display unit 250 to display a partial image 810 of the original image 801 in the expanded area 803. At the same time, the control unit 290 may display a first indicator 820 for indicating the degree to which the screen of the display unit 250 is expanded to the maximum, a second indicator 821 for indicating the size of the original image 801, and a third indicator 822 for indicating the size displayed on the screen of the display unit 250 in the entire size of the original image 801.

Figure 15B:
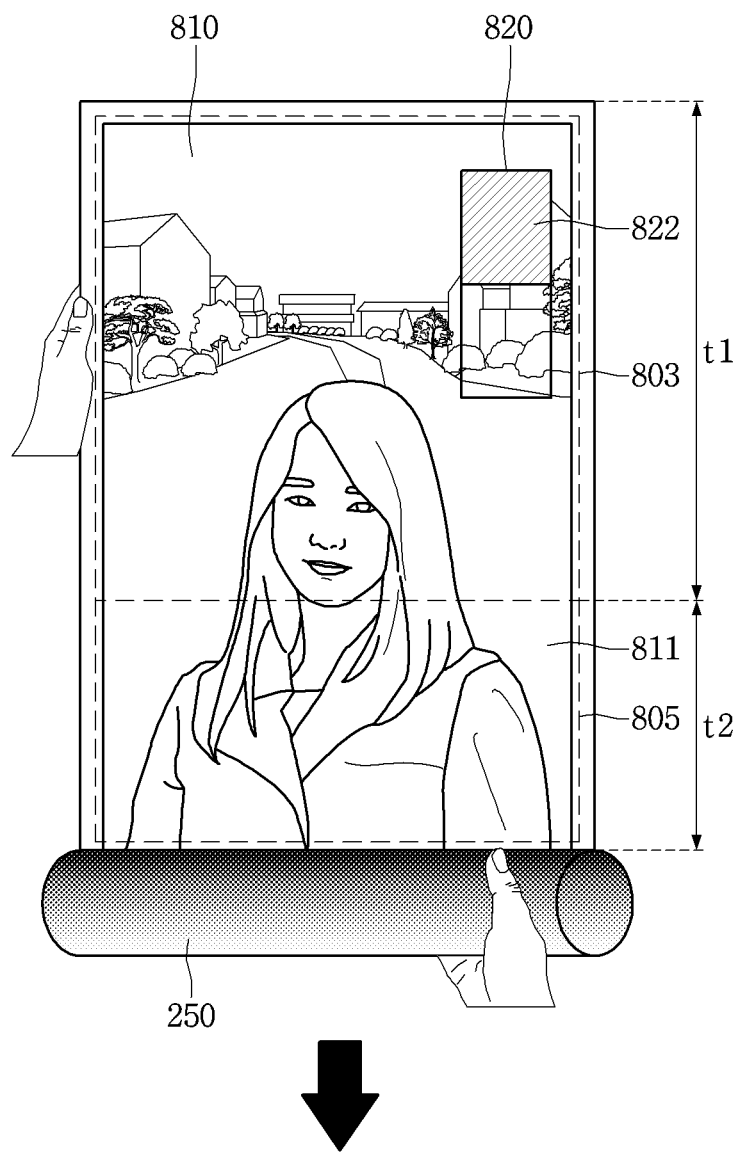

When a force for additionally expanding the screen of the display unit 250 is applied in the state of FIG. 15A, the control unit 290, as shown in FIG. 15B, may perform a control to additionally expand the screen of the display unit 250 by an area 805 corresponding to a distance t2 and display the remaining image 811 of the original image 801 that is not displayed in the expanded area 805. It is assumed that an image corresponding to the size of the original image 801 is displayed in the total expansion areas 803 and 805. In this case, the third indicator 822 may indicate that the original image 801 is displayed in an actual size on the screen of the display unit 250.

Figure 15C:
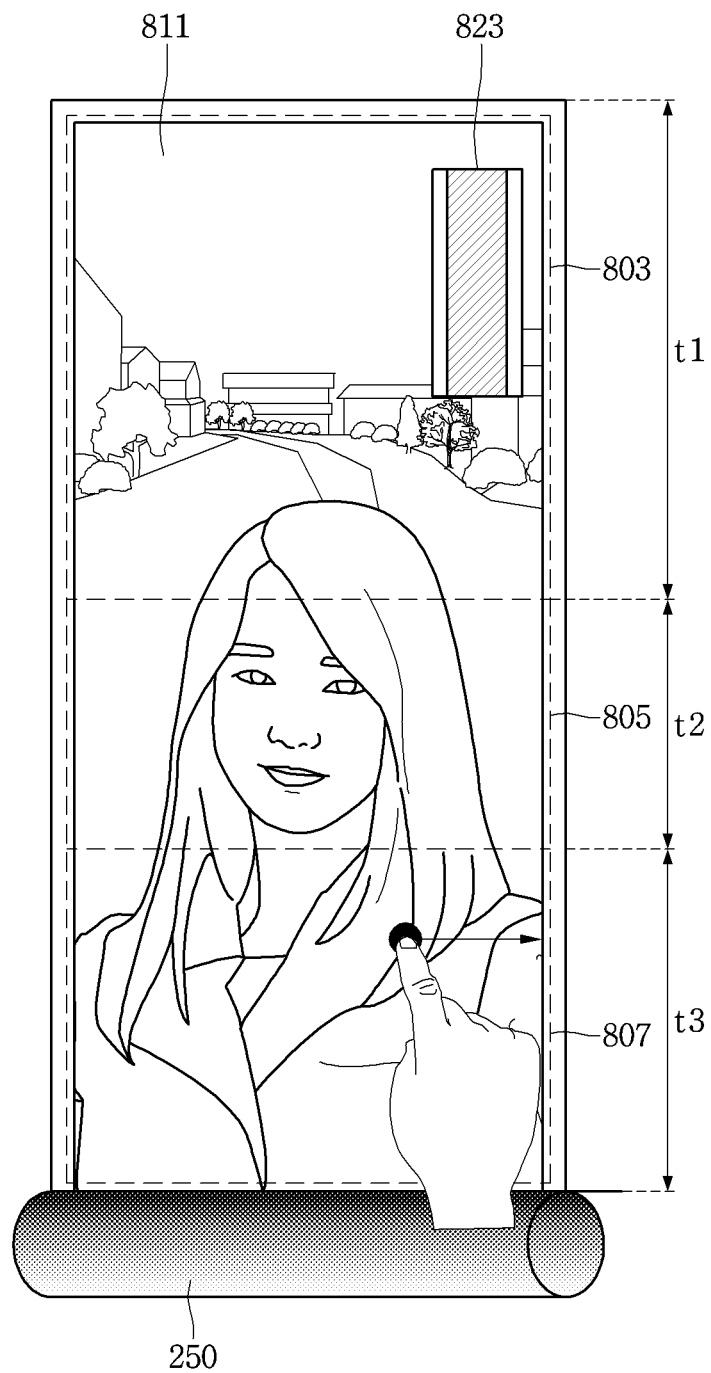
Figure 15D:
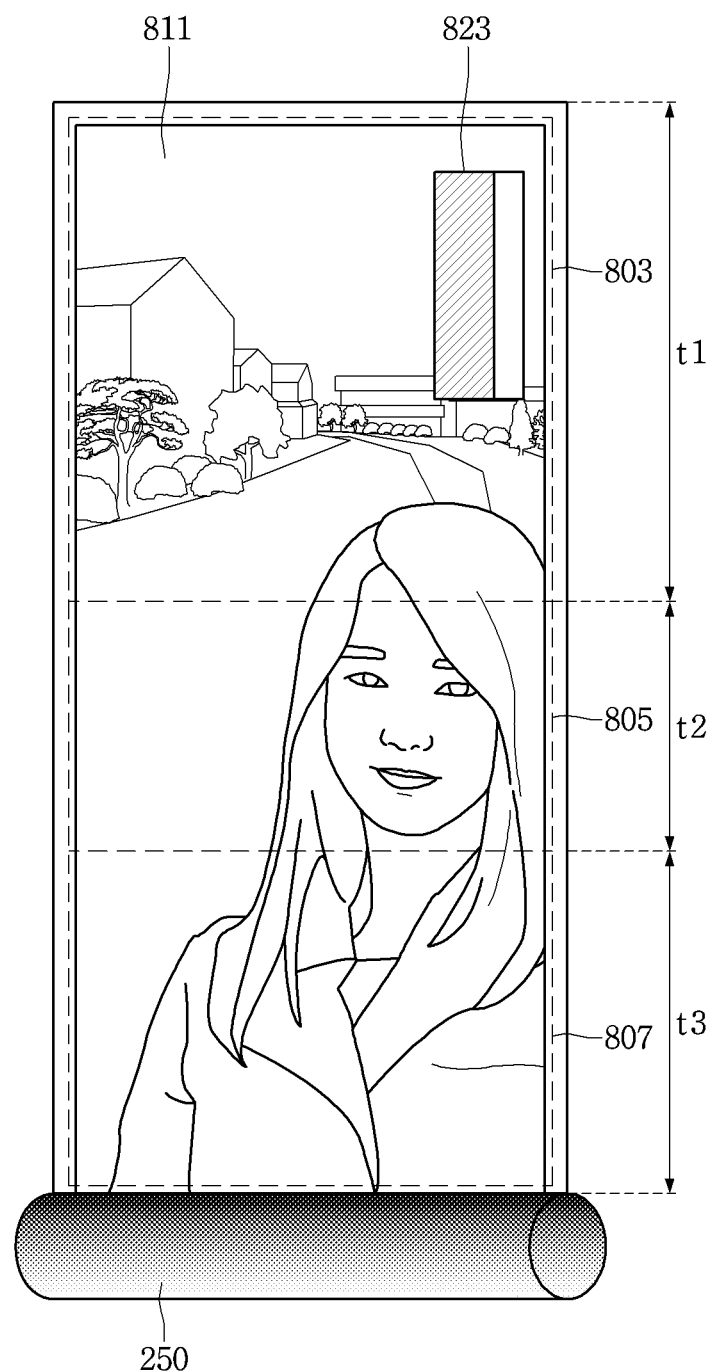

When the screen of the display unit 250 is additionally expanded that is detected in the state of FIG. 15B, the control unit 290, as shown in FIG. 15C, may additionally expand the screen of the display unit 250 by an area 807 corresponding to a distance t3. It is assumed in FIG. 15C that the screen of the display unit 250 is expanded to the maximum size. As the screen of the display unit 250 is expanded by the area 807, the control unit 290 may perform a control on the display unit 250 to enlarge and display an original image. The control unit 290 may perform a control on the display unit 250 to display a fourth indicator 823 for indicating which part the currently displayed image represents in the image 811 of the expanded state. When an input for selecting one point of the expanded image 811 and flicking to the left is received, the control unit 290, as shown in FIG. 15D, may move the expanded image 811 to the right and change a displayed part. Accordingly, the fourth indicator 823 may indicate that the displayed part of the expanded image 811 is changed.

According to another embodiment of the present invention, an operation mode of the rollable display device 200_2 may vary depending on a direction that the screen of the display unit 250 is expanded.

FIGS. 16A to 16F are views illustrating a case that an operation mode of a rollable display device varies depending on a direction that the screen of a display unit is expanded according to an embodiment of the present invention.

Figure 16A:
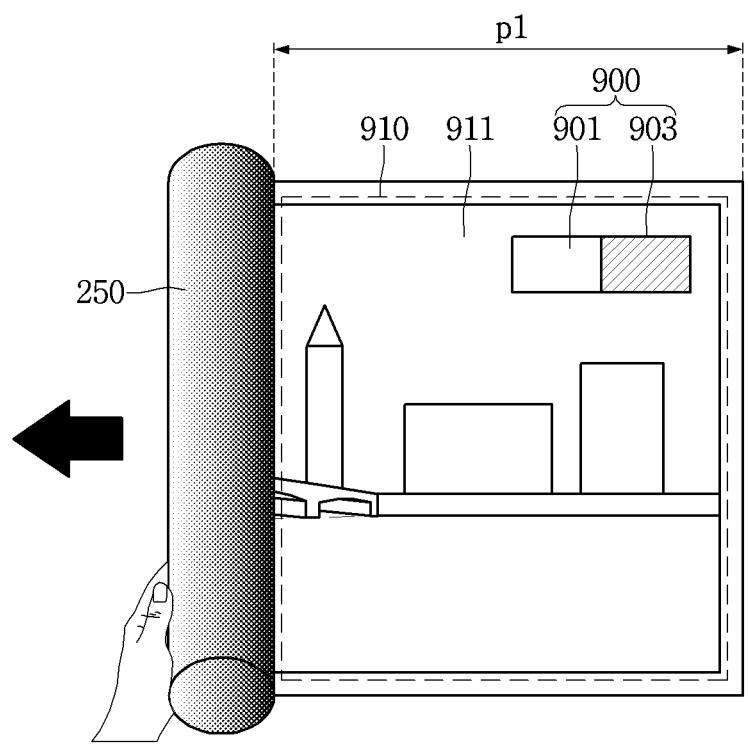
FIG. 16A, FIG. 16B, FIG. 16C, FIG. 16D, FIG. 16E, and FIG. 16F are views illustrating a case that an operation mode of a rollable display device varies depending on a direction that the screen of a display unit is expanded according to an embodiment of the present invention.
Figure 16B:
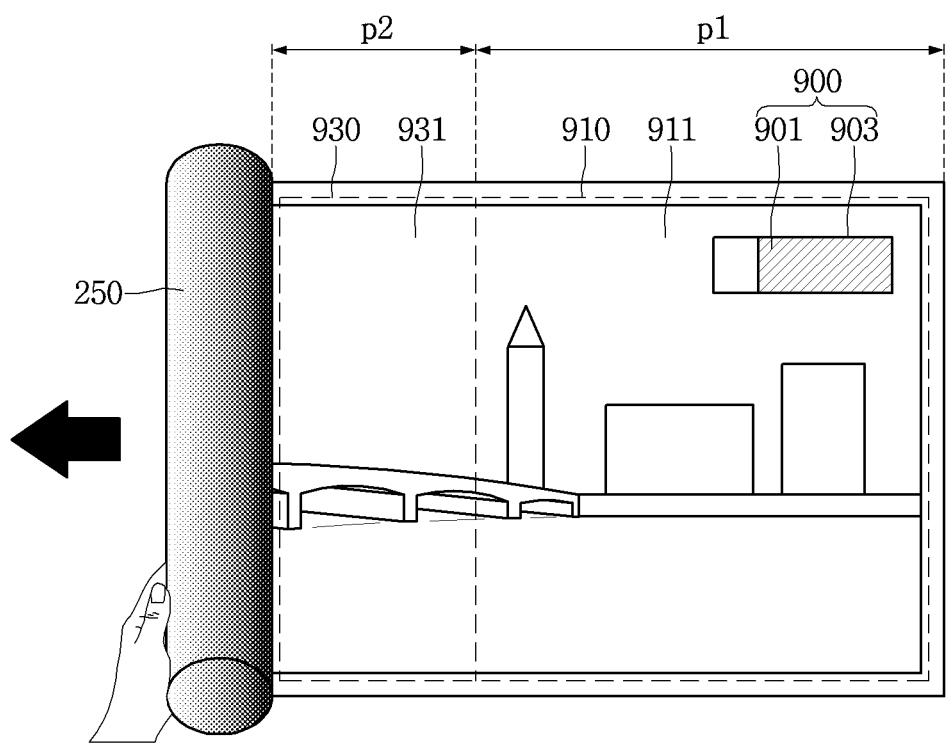
Figure 16C:
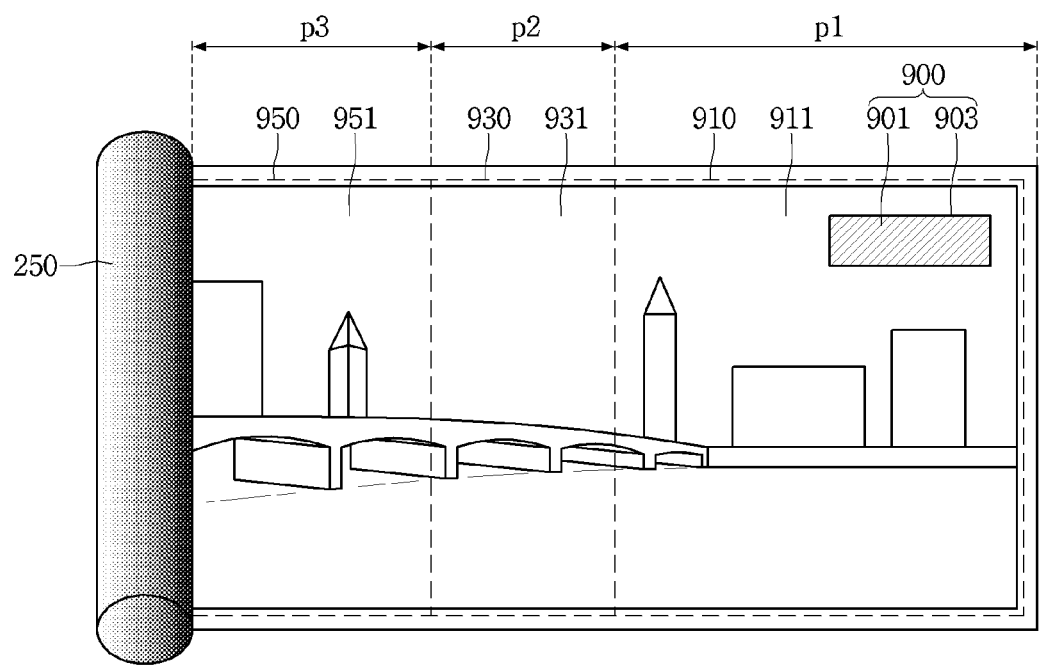

First, FIGS. 16A to 16C are views illustrating a first display mode where as the screen of the display unit 250 is expanded in the −x axes direction, content information not yet displayed is displayed gradually.

Referring to FIG. 16A, the screen of the display unit 250 is in a state of being expanded in the −x axis direction by an area 910 corresponding to a distance p1. A partial image 911 of an entire image may be displayed in the area 910. Additionally, an expansion guide bar 901 for indicating the degree to which the screen of the display unit 250 is expanded and a movement bar 903 for indicating to what degree the screen of the display unit 250 is expanded currently may be displayed in the area 910. When the screen of the display unit 250 is additionally expanded in the −x axis direction that is detected in FIG. 16A, the control unit 290 may expand the screen of the display unit 250 by an area 930 corresponding to a distance p2 and may display a partial image 931 that is not displayed yet in the entire image, in the expanded area 930. Accordingly, the movement bar 903 may be moved by a size corresponding to the distance p2 on the expansion guide bar 901. When the screen of the display unit 250 is additionally expanded in the −x axis direction that is detected in FIG. 16B, the control unit 290 may expand the screen of the display unit 250 by an area 950 corresponding to a distance p3 and may display the remaining image 951 that is not displayed yet in the entire image, in the expanded area 950. The movement bar 903 may be moved by a size corresponding to the distance p3 on the expansion guide bar 901. When it is assumed that the screen of the display unit 250 is expanded to the maximum size in FIG. 16C, the movement bar 903 also may change its form on the expansion guide bar 901 in order to indicate that the screen is expanded to the maximum size.

Figure 16D:
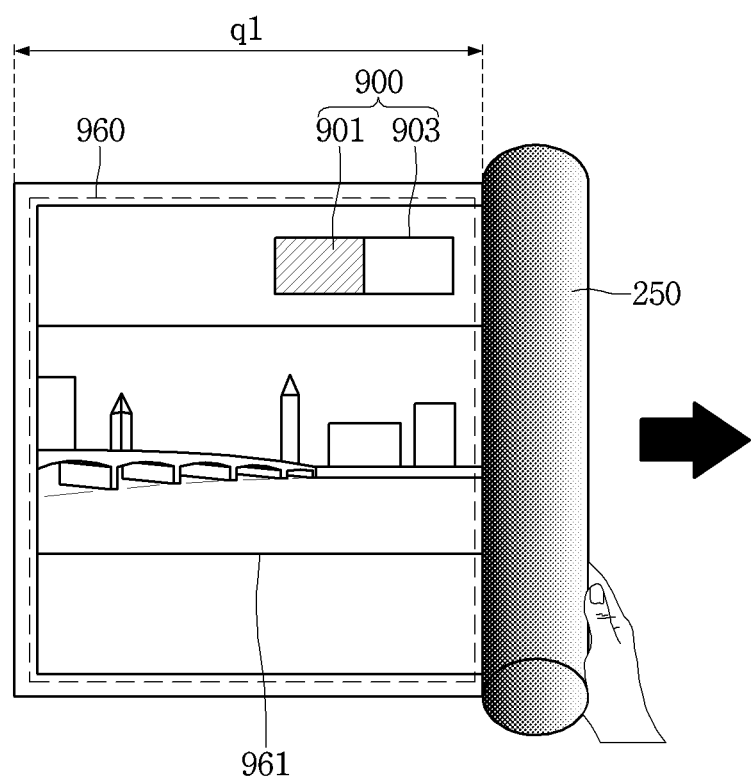
Figure 16E:
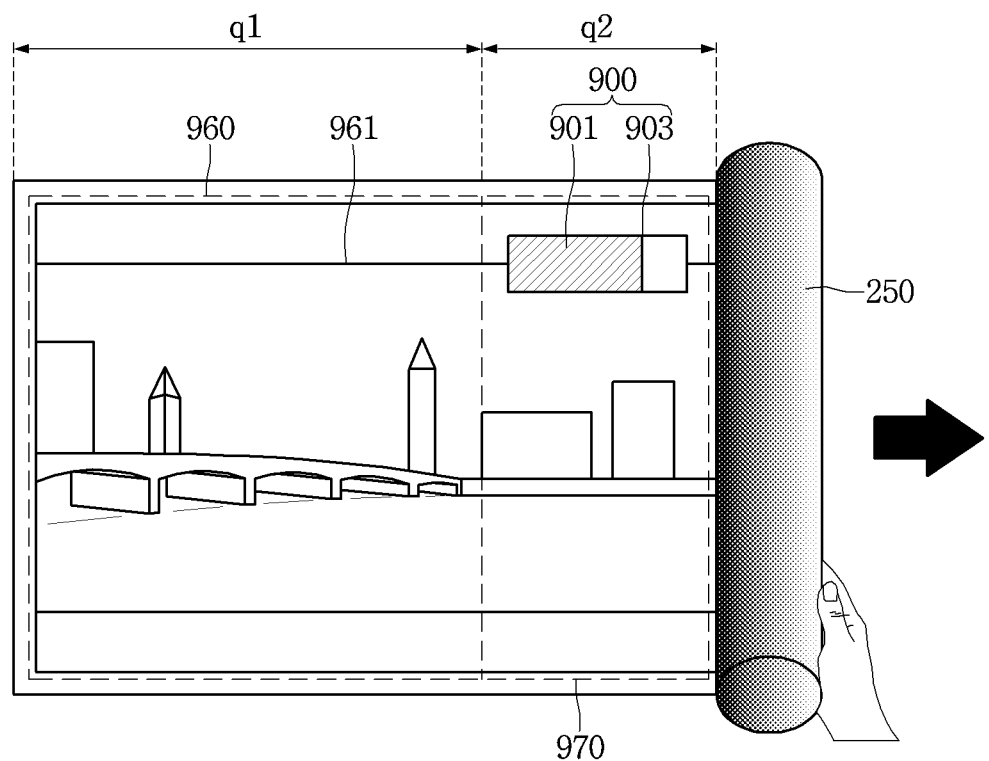
Figure 16F:
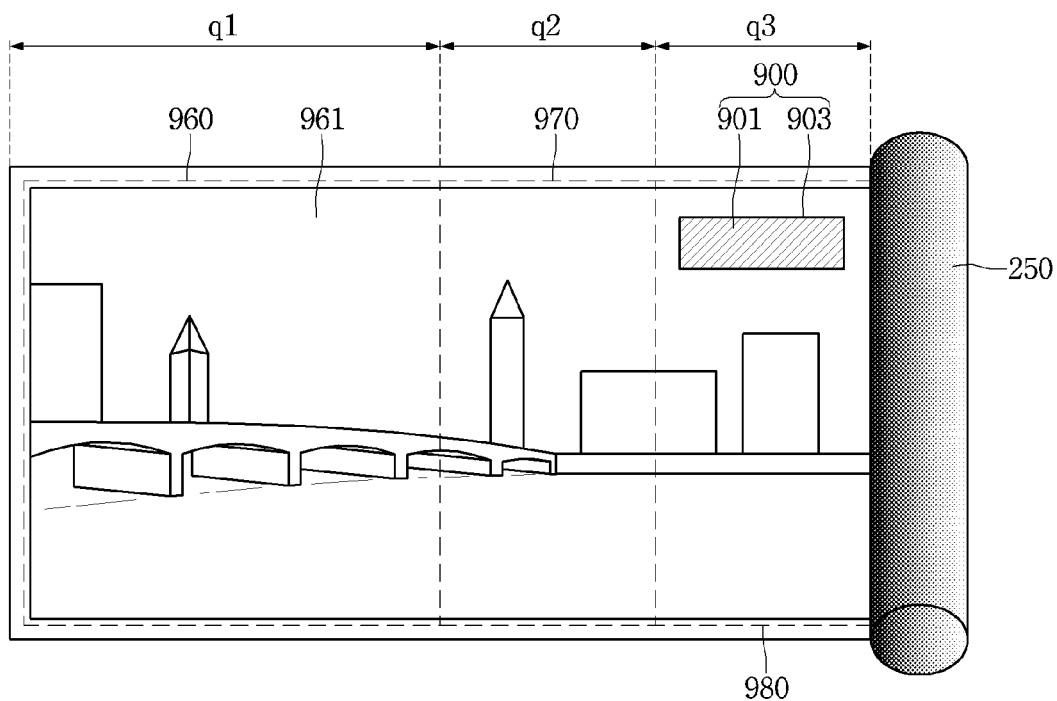

Then, FIGS. 16D and 16F are described.

FIGS. 16D to 16F are views when a second display mode operates where as the screen of the display unit 250 is expanded in the +x axes direction, content information is optimized for an expanded screen and displayed.

Referring to FIG. 16D, the screen of the display unit 250 is in a state of being expanded in the +x axis direction by an area 960 corresponding to a distance q1. An entire image 961 may be displayed in the area 960. Additionally, an expansion guide bar 901 for indicating the degree to which the screen of the display unit 250 is expanded and a movement bar 903 for indicating to what degree the screen of the display unit 250 is expanded currently may be displayed in the area 960. When the control unit 290 detects that the screen of the display unit 250 is additionally expanded in the +x axis direction in FIG. 16D, the control unit 290 may expand the screen of the display unit 250 by an area 970 corresponding to a distance q2 and may expand the image 951 to match a ratio of the expanded area 970 and display it. The movement bar 903 may be moved by a size corresponding to the distance q2 on the expansion guide bar 901. When the control unit 290 detects that the screen of the display unit 250 is expanded in the +x axis direction in FIG. 16E, the control unit 290 may expand the screen of the display unit 250 by an area 980 corresponding to a distance q3 and may expand the image 961 to match a ratio of the expanded area 980 and display it. The movement bar 903 may be moved by a size corresponding to the distance q3 on the expansion guide bar 901. When it is assumed that the screen of the display unit 250 is expanded to the maximum size in FIG. 16F, the movement bar 903 also may change its form on the expansion guide bar 901 in order to indicate that the screen is expanded to the maximum size.

According to the embodiments of FIGS. 16A to 16F, according to which direction the display unit 250 of the rollable display device 200_2 is unrolled by a user, its mode changed so that various forms of content information may be provided.

According to various embodiments of the present invention, since a variety of information is provided according to the degree to which the screen size of a display unit is expanded, a user's demand may be satisfied.

Additionally, according to an embodiment of the present invention, while using a flexible display device, a user may easily check the degree to which the screen of a display unit is stretchable and the remaining content information amount. The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

What is claimed is:

1. A flexible display device comprising:
   a display configured to display content information on a display screen that is expandable or reducible;
   a sensor configured to detect a size of the display screen; and
   a control configured to control the display and the sensor, the controller is further configured to:
   display on the display screen a first indicator to indicate an amount that the display screen is expandable and a second indicator to indicate an amount of remaining content information to be displayed from an entirety of the content information,
   detect that the display screen is additionally expanded when the display screen is not expanded to maximum and the entirety of the content information is displayed on the display screen, and
   enlarge the entirety of the content information as the display screen is additionally expanded,
   wherein the first indicator and the second indicator are displayed when the control unit detect that the display screen is expanded or reduced,
   a location of the first indicator is moved to an expanded display screen or a reduce display screen according to detecting that the display screen is expanded or reduced, and
   wherein the controller is further configured to:
   display a reduction view icon if the display screen is expanded to maximum and the entirety of the content information is not displayed on the display screen,
   reduce the entirety of the content information according to a request for selecting the reduction view icon, and
   display the reduced entirety of the content information on the display screen having maximum size.

2. The device of claim 1, wherein the first indicator comprises:
   an expansion guide bar to indicate an amount that the display screen is expanded with respect to a fully expanded size of the display screen; and
   a movement bar provided on the expansion guide bar to indicate an amount that the display screen is currently expanded.

3. The device of claim 1, wherein the second indicator comprises:

an entire information amount bar to indicate an amount of the entire content information; and a movement information bar to indicate an amount of content information that is displayed on the display screen with respect to the entire content information amount.

4. The device of claim 1, wherein if the content information includes more than one page, the control unit displays on the second indicator a page number of the content information that is currently displayed on the display screen with respect to the total number of pages of content information.

5. The device of claim 4, wherein the entire information amount bar includes a plurality of sub areas respectively representing the plurality of pages of content information.

6. The device of claim 1, wherein the control unit detects whether the display screen is expanded or reduced in a specific direction, and displays on the first indicator an amount of the expansion or the reduction of the display screen when the expansion or reduction is detected.

7. The device of claim 1, wherein the control unit determines whether the entirety of the content information will display on the display screen when the display screen is fully expanded, wherein when the control unit determines that the entirety of the content information will not display on the display screen when the display screen is fully expanded, the control unit sequentially displays on the display screen remaining content information and does not sequentially display existing displayed content information as the display screen is expanded.

8. The device of claim 1, wherein the control unit detects whether the display screen is fully expanded, determines whether the entirety of the content information is displayed on the display screen when the display screen is not fully expanded, detects an expanded area of the display screen in a specific direction when the entirety of the content information is displayed on the display screen, and displays information relating to the content information in the expanded area.

9. The device of claim 1, wherein the display screen is a rollable display screen that is unwound from the display unit.

10. The device of claim 9, wherein the control unit displays the first indicator and the second indicator based on a size of the unwound display screen.

11. The device of claim 10, wherein the control unit changes a display of the first indicator or a display of the second indicator when the size of the unwound display screen is changed.

12. A method for operating a flexible display device, comprising:

displaying, by a display, content information on a display screen that is expandable or reducible;

detecting, by a sensor, a size of the display screen in a specific direction;

displaying, by a controller, an amount of content information based on the size of the display screen in the specific direction; and displaying, by the controller, on the display screen, a first indicator to indicate an amount that the display screen is expandable and a second indicator to indicate an amount of remaining content information to be displayed from an entirety of the content information;

detecting that the display screen is additionally expanded when the display screen is not expanded to maximum and the entirety of the content information is displayed on the display screen; and enlarging the entirety of the content information as the display screen is additionally expanded, wherein the first indicator and the second indicator are displayed when the control unit detect that the display screen is expanded or reduced, a location of the first indicator is moved to an expanded display screen or a reduce display screen according to detecting that the display screen is expanded or reduced, and wherein the method is further comprises:

displaying a reduction view icon if the display screen is expanded to maximum and the entirety of the content information is not displayed on the display screen, reducing the entirety of the content information according to a request for selecting the reduction view icon, and displaying the reduced entirety of the content information on the display screen having maximum size.

13. The method of claim 12, wherein the display screen is a rollable display screen that is unwound from the display unit.

14. The method of claim 13, further comprising displaying, by the controller, the first indicator and the second indicator based on a size of the unwound display screen.

15. The method of claim 14, further comprising changing, by the controller, a display of the first indicator or a display of the second indicator when the size of the unwound display screen is changed.

* * * * *